(12) United States Patent
Kinomoto et al.

(10) Patent No.: US 10,689,070 B2
(45) Date of Patent: Jun. 23, 2020

(54) BOAT AND PERSONAL WATERCRAFT

(71) Applicant: YAMAHA HATSUDOKI KABUSHIKI KAISHA, Iwata-shi, Shizuoka (JP)

(72) Inventors: Naoki Kinomoto, Shizuoka (JP); Sumihiro Takashima, Shizuoka (JP); Ryutaro Iwaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/274,297

(22) Filed: Feb. 13, 2019

(65) Prior Publication Data

US 2019/0300132 A1  Oct. 3, 2019

(30) Foreign Application Priority Data

Mar. 27, 2018 (JP) ................. 2018-059365

(51) Int. Cl.
| | | |
|---|---|---|
| *B63B 35/73* | (2006.01) | |
| *B63H 21/21* | (2006.01) | |
| *B60W 10/04* | (2006.01) | |
| *B63B 34/10* | (2020.01) | |
| *G05D 1/02* | (2020.01) | |
| *B63H 25/02* | (2006.01) | |
| *B63B 39/03* | (2006.01) | |

(52) U.S. Cl.
CPC .............. *B63B 34/10* (2020.02); *B63B 39/03* (2013.01); *B63H 21/21* (2013.01); *B63H 25/02* (2013.01); *B63H 2025/022* (2013.01); *G05D 1/0206* (2013.01)

(58) Field of Classification Search
CPC ... B63B 35/73; B63B 35/731; B63B 2035/73; B63H 21/21; B63H 21/22; B63H 21/24; B63H 2021/21; B63H 2021/216; G05D 1/0206
USPC .......... 440/1, 2, 38, 84, 87; 114/55.5, 55.57; 701/21
See application file for complete search history.

(56) References Cited

U.S. PATENT DOCUMENTS

| | | | |
|---|---|---|---|
| 6,659,815 B2 * | 12/2003 | Motsenbocker | ......... B63H 1/28 |
| | | | 440/1 |
| 6,772,061 B1 | 8/2004 | Berthiaume et al. | |
| 9,926,062 B2 * | 3/2018 | Anma | ................... B63B 35/731 |
| 2015/0166058 A1 | 6/2015 | Mizutani et al. | |
| 2016/0266580 A1 | 9/2016 | Okamoto et al. | |
| 2017/0274972 A1 | 9/2017 | Anma | |

FOREIGN PATENT DOCUMENTS

| | | |
|---|---|---|
| JP | 2012-146153 A | 8/2012 |
| JP | 2014-081666 A | 5/2014 |
| JP | 2015-118510 A | 6/2015 |
| JP | 2016-169691 A | 9/2016 |
| JP | 2017-171086 A | 9/2017 |

* cited by examiner

*Primary Examiner* — Daniel V Venne
(74) *Attorney, Agent, or Firm* — Keating and Bennett, LLP

(57) ABSTRACT

A small boat includes an engine, a display that displays a speed setting image of a boat body and an acceleration setting image of the boat body side by side, an operator including a speed setting operator through which an operation of setting a speed set value is received and an acceleration setting operator through which an operation of setting an acceleration set value is received, and an engine controller that controls the engine based on the operations received by the operator.

20 Claims, 10 Drawing Sheets

FIG. 13 PROCESS OPERATIONS FOR SETTING LOCKING AND UNLOCKING

BOAT AND PERSONAL WATERCRAFT

CROSS REFERENCE TO RELATED APPLICATIONS

This application claims the benefit of priority to Japanese Patent Application No. 2018-059365 filed on Mar. 27, 2018. The entire contents of this application are hereby incorporated herein by reference.

BACKGROUND OF THE INVENTION

1. Field of the Invention

The present invention relates to a boat and a personal watercraft.

2. Description of the Related Art

A personal watercraft including a speed setting operator that receives an operation of setting the speed set value of a boat body is known in general. Such a personal watercraft is disclosed in U.S. Pat. No. 6,772,061, for example.

U.S. Pat. No. 6,772,061 discloses a system (a system for a personal watercraft) including a data port that receives an operation of setting an operating parameter involved in the speed of a boat body. In this system, a key, a controller, and a corresponding unit are provided. The data port acquires a control signal from the key, and transmits a signal related to the instructed performance level to the controller based on the acquired control signal. The controller acquires operating parameter information from the corresponding unit based on the signal related to the performance level, and sets the operating parameter based on the operating parameter information. The operating parameter is set to a set value (discrete set value) of 1500 RPM, 3000 RPM, or 4500 RPM as the upper limit of the rotational speed of an engine that serves as a value involved in the speed of the boat body. The controller controls the engine based on the set operating parameter.

A small boat including a display is known in general. Such a small boat is disclosed in Japanese Patent Laid-Open No. 2016-169691, for example.

Japanese Patent Laid-Open No. 2016-169691 discloses a jet propelled boat (small boat) including a display. The jet propelled boat includes a boat speed detector and a controller having a cruise control function of keeping the boat speed constant at a set speed based on the boat speed detected by the boat speed detector. The display displays a screen (hereinafter referred to as a "set speed setting screen") on which the set speed is set. The display includes a touch panel, and receives an operation of setting the set speed due to a touch operation on a set speed setting screen. In addition, the display displays a screen (hereinafter referred to as an "acceleration setting screen") on which the acceleration until the boat speed reaches the set speed is set. The display receives an operation of setting the acceleration due to a touch operation on the acceleration setting screen. Thus, in the jet propelled boat disclosed in Japanese Patent Laid-Open No. 2016-169691, a boat operator sets the set speed and the acceleration separately while visually recognizing one of the set speed setting screen and the acceleration setting screen of the display, unlike the system disclosed in U.S. Pat. No. 6,772,061.

However, conceivably in the jet propelled boat (small boat) disclosed in Japanese Patent Laid-Open No. 2016-169691, when setting both the set speed and the acceleration, the boat operator first sets the set speed in a state in which the display displays the set speed setting screen, the display switches the set speed setting screen to the acceleration setting screen, and then the boat operator sets the acceleration. Therefore, in the jet propelled boat disclosed in Japanese Patent Laid-Open No. 2016-169691, it is necessary to switch the screen and set the set speed and the acceleration, and thus the boat operator is not able to set the set speed and the acceleration while visually recognizing the set speed setting screen and the acceleration setting screen at the same time. Therefore, in general, a small boat and a personal watercraft in which a boat operator sets a set speed (speed set value) and acceleration (acceleration set value) individually while visually recognizing a set speed setting screen (speed setting image) and an acceleration setting screen (acceleration setting image) at the same time has been desired.

SUMMARY OF THE INVENTION

Preferred embodiments of the present invention provide boats and personal watercrafts in which a boat operator sets a speed set value and an acceleration set value individually while visually recognizing a speed setting image and an acceleration setting image at the same time.

A boat according to a preferred embodiment of the present invention includes an engine disposed in a boat body, a display that displays a speed setting image of the boat body and an acceleration setting image of the boat body side by side, an operator including a speed setting operator through which an operation of setting a speed set value of the boat body is received and an acceleration setting operator operated independently of the speed setting operator and through which an operation of setting an acceleration set value of the boat body is received, and an engine controller configured or programmed to control driving of the engine based on the operations received by the operator.

In a boat according to a preferred embodiment of the present invention, the display displays the speed setting image of the boat body and the acceleration setting image of the boat body side by side. Furthermore, the operator includes the speed setting operator and the acceleration setting operator operated independently of the speed setting operator and through which an operation of setting the acceleration set value of the boat body is received. Accordingly, when the operations of setting the speed set value and the acceleration set value are performed, the operation of setting the speed set value and the operation of setting the acceleration set value are received individually while a boat operator is allowed to visually recognize both the speed setting image and the acceleration setting image. Consequently, the boat operator sets the speed set value and the acceleration set value individually while visually recognizing the speed setting image and the acceleration setting image at the same time. Unlike the case in which only one of the speed setting image and the acceleration setting image is displayed on the display, an operation of switching a state in which the speed setting image is displayed on the display and a state in which the acceleration setting image is displayed on the display is not required. Consequently, the operability and convenience at the time of setting are further improved while the operations of setting the speed set value and the acceleration set value individually are enabled.

In a boat according to a preferred embodiment of the present invention, the speed setting operator preferably receives an operation of setting an option of one speed selected from among a plurality of options corresponding to a plurality of speeds as the speed set value, and the acceleration setting operator preferably receives an operation of setting an option of one acceleration selected from among a plurality of options corresponding to of a plurality of accelerations as the acceleration set value. Accordingly, one option is selected from among a plurality of options such that each of the speed set value and the acceleration set value is set, and thus the operation procedure is simplified as compared with the case in which it is necessary to specifically input the speed set value and the acceleration set value. Thus, the operability and convenience at the time of setting are still further improved.

In such a case, the speed setting operator preferably receives an operation of setting an option of one speed selected from among a plurality of options corresponding to three speeds as the speed set value, and the acceleration setting operator preferably receives an operation of setting an option of one acceleration selected from two options corresponding to two accelerations as the acceleration set value. Accordingly, a total of six combinations of the speed set value and the acceleration set value is able to be set, and thus the speed set value and the acceleration set value are more appropriately set according to the skill level of the boat operator of the boat or to the sea conditions, for example, as compared with the case in which less than six combinations of the speed set value and the acceleration set value are able to be set. In addition, as compared with the case in which more than six combinations of the speed set value and the acceleration set value are able to be set, the number of options does not become too large, and thus the speed set value and the acceleration set value are appropriately set while a complicated operation of selecting one option from among a plurality of options is significantly reduced or prevented.

In a boat according to a preferred embodiment of the present invention, the display preferably includes the operator and is preferably a single touch panel that displays the speed setting image and the acceleration setting image on a same screen, and the touch panel preferably receives a touch operation on the speed setting image as an operation on the speed setting operator, and receives a touch operation on the acceleration setting image as an operation on the acceleration setting operator. Accordingly, it is not necessary to provide a plurality of displays, and it is not necessary to provide an operator separately from the display, and thus the number of components and the number of component types in the boat are reduced.

In such a case, the touch panel preferably displays at least one of the speed setting image and the acceleration setting image as a switching image showing a portion of a plurality of option images, and switches an option image displayed as the switching image based on the touch operation on the switching image. Accordingly, it is not necessary to display all of the plurality of option images on the touch panel, and thus an increase in the size of the touch panel is significantly reduced or prevented.

In a boat including the display that displays the switching image, the touch panel preferably displays the speed setting image as the switching image to set a speed, and displays the acceleration setting image as the switching image to set an acceleration. Accordingly, an increase in the size of the touch panel is further significantly reduced or prevented as compared with the case in which the display displays only one of the speed setting image and the acceleration setting image as the switching image.

In a boat including the display that displays the switching image, the touch panel preferably displays a determination operator image through which the displayed option image is determined as the speed set value or the acceleration set value and receives a touch operation on the determination operator image, and the engine controller preferably is configured or programmed to determine the displayed option image as the speed set value or the acceleration set value according to the touch operation on the determination operator image. Accordingly, the boat operator determines whether to determine an option corresponding to the displayed option image as the speed set value or the acceleration set value (whether to perform a touch operation on the determination operator image) or to select another option (to select another option without performing a touch operation on the determination operator image) while visually recognizing the option image. Consequently, the convenience of an operation of determining one option from a plurality of options is improved.

In a boat including the display that displays the switching image, the touch panel preferably switches the option image of the switching image periodically and in stages in an upward-downward direction based on the touch operation on the switching image. Accordingly, the option image is switched periodically such that even after all the option images are sequentially displayed by switching the option image of the switching image, the option image is periodically and repetitively displayed. Furthermore, the option image is switched in stages such that the boat operator easily predicts the option image to be displayed after switching as compared with the case in which the option image is switched randomly instead of in stages.

In such a case, the touch panel preferably displays the switching image on which the plurality of option images are visibly aligned in the upward-downward direction. Accordingly, unlike the case in which only one option image is displayed on the switching image, the boat operator visually recognizes one option image and another option image (an image showing an option at the next stage). Consequently, the boat operator visually recognizes the image showing the option at the next stage so as to more easily predict the option image to be displayed after switching.

In a boat including the display that switches the option image of the switching image periodically and in stages in the upward-downward direction, the touch panel preferably displays the speed setting image as the switching image to set a speed, displays the acceleration setting image as the switching image to set an acceleration adjacent to the speed setting image in a right-left direction, and switches the option image of the switching image on which the touch operation has been performed in the upward-downward direction based on the touch operation on the switching image to set a speed or the switching image to set an acceleration. Accordingly, as compared with the case in which the switching image to set a speed and the switching image to set an acceleration are disposed adjacent to each other in the upward-downward direction, one of the switching image to set a speed and the switching image to set an acceleration is switched in the upward-downward direction such that the other switching image is easily operated without a touch operation on the other switching image.

In a boat including the display, which preferably is the touch panel, the touch panel preferably receives the touch operation on the speed setting image and the touch operation on the acceleration setting image when a rotational speed of the engine is equal to or less than an upper limit of an idling rotational speed range, and does not receive the touch operation on the speed setting image or the touch operation on the acceleration setting image when the rotational speed of the engine exceeds the upper limit. Accordingly, an operation on the touch panel by the boat operator during traveling of the boat is significantly reduced or prevented.

In a boat including the display, which preferably is the touch panel, the touch panel preferably receives a touch operation performed by moving a finger of a boat operator from a lower side to an upper side on the speed setting image and a touch operation performed by moving the finger of the boat operator from the lower side to the upper side on the acceleration setting image, and does not receive a touch operation performed by moving the finger of the boat operator from the upper side to the lower side on the speed setting image or a touch operation performed by moving the finger of the boat operator from the upper side to the lower side on the acceleration setting image. In a typical electrostatic capacitance touch panel, when water droplets adhere to the touch panel and move from the upper side to the lower side, the movement of the water droplets may be conceivably interpreted as a touch operation from the upper side to the lower side. On the other hand, according to a preferred embodiment of the present invention, the touch panel receives a touch operation performed by moving the finger of the boat operator from the lower side to the upper side and does not receive a touch operation performed by moving the finger of the boat operator from the upper side to the lower side, and thus even when water droplets move from the upper side to the lower side on the touch panel, the movement of the water droplets is prevented from being interpreted as a touch operation.

In a boat according to a preferred embodiment of the present invention, the operator preferably does not receive an operation of setting the speed set value or an operation of setting the acceleration set value when receiving a lock operation performed by inputting a plurality of identification characters. Accordingly, manipulations on the speed set value and the acceleration set value by a boat operator other than the boat operator that is permitted to change the setting are restricted. Furthermore, the operator including the speed setting operator and the acceleration setting operator receives a lock operation such that it is not necessary to provide another operator that receives a lock operation separately from the operator. Consequently, manipulations on the speed set value and the acceleration set value by a boat operator other than the boat operator that is permitted to change the setting are restricted while a complicated structure of the boat is significantly reduced or prevented. Thus, convenience to the boat operator is improved.

In such a case, the display preferably also includes the operator and is preferably a single touch panel that displays the speed setting image and the acceleration setting image on a same screen, and the touch panel preferably switches the speed setting image and the acceleration setting image to a locking image through which the lock operation is received and displays the locking image in an image region in which the speed setting image and the acceleration setting image are displayed. Accordingly, unlike the case in which the touch panel further displays the locking image while displaying the speed setting image and the acceleration setting image, an increase in the size of the touch panel is significantly reduced or prevented.

In a boat including the display that displays the locking image, the touch panel preferably switches an identification character input image as the locking image through which the plurality of identification characters are input to a lock determination image as the locking image in the image region. Accordingly, unlike the case in which the touch panel further displays the identification character input image while displaying the lock determination image, an increase in the size of the touch panel is significantly reduced or prevented.

In a boat according to a preferred embodiment of the present invention, the display preferably has a screen size of 4 inches or more and 12 inches or less. Accordingly, the speed setting image and the acceleration setting image are relatively largely displayed as compared with the case in which the display has a screen size of less than 4 inches, and thus the visibility of the images displayed on the display is improved. Furthermore, the display has a screen size of 12 inches or less such that unlike the case in which the display has a screen size of more than 12 inches, the display is easily placed on a personal watercraft even when a preferred embodiment of the present invention is applied to a personal watercraft, which is relatively small among boats.

In a boat according to a preferred embodiment of the present invention, the engine preferably has a displacement of 1050 cc or more and less than 2100 cc. In a personal watercraft in which an engine has a displacement of 1050 cc or more and less than 2100 cc, it is preferable to change the speed set value (the maximum speed, for example) and the acceleration set value particularly depending on the skill level and age of the boat operator. On the other hand, a preferred embodiment of the present invention is applied to the boat in which the engine has a displacement of 1050 cc or more and less than 2100 cc, and thus the operability and convenience at the time of setting are more effectively and further improved in response to a need while the operations of setting the speed set value and the acceleration set value individually are enabled.

In a boat according to a preferred embodiment of the present invention, the display preferably displays a boat information image indicating information about the boat and the speed setting image or the acceleration setting image side by side. Accordingly, the boat operator sets the speed set value or the acceleration set value while visually recognizing (referring to) the information about the boat. Consequently, when setting the speed set value or the acceleration set value according to the information about the boat, the boat operator performs a setting operation without switching a screen showing the information about the boat to a screen on which the speed setting image and the acceleration setting image are displayed. Consequently, the operability and convenience are still further improved.

In a boat according to a preferred embodiment of the present invention, the operator preferably includes a skill level information setting operator through which an operation of setting skill level information about a boat operator is received and the speed setting operator through which an operation of setting a maximum speed set value as the speed set value is received, and the display preferably switches display contents of a maximum speed setting image as the speed setting image through which the maximum speed set value is set and switches display contents of the acceleration setting image based on an operation on the skill level information setting operator. Accordingly, the optimum speed setting image and acceleration setting image are displayed according to the skill level of the boat operator, and thus the convenience of setting the speed set value and setting the acceleration set value by the boat operator is further improved.

A personal watercraft according to a preferred embodiment of the present invention includes an engine disposed in a boat body, a display that displays a speed setting image of the boat body and an acceleration setting image of the boat body side by side, an operator including a speed setting operator through which an operation of setting a speed set value of the boat body is received and an acceleration setting operator operated independently of the speed setting operator and through which an operation of setting an acceleration set value of the boat body is received, and an engine controller configured or programmed to control driving of the engine based on the operations received by the operator.

In a personal watercraft according to a preferred embodiment of the present invention as described above, the operability and convenience at the time of setting are improved while the operations of setting the speed set value and the acceleration set value individually are enabled.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a small boat 100 according to a first preferred embodiment of the present invention is now described with reference to FIGS. 1 to 11. The small boat 100 is a personal watercraft (PWC), for example, and is a water jet propelled boat (water motorcycle). That is, the small boat 100 is a straddled watercraft. In the following description, the terms "front" and "forward movement direction" represent a direction FWD in FIG. 1, and the terms "rear" and "rearward movement direction" represent a direction BWD in FIG. 1.

Figure 1:
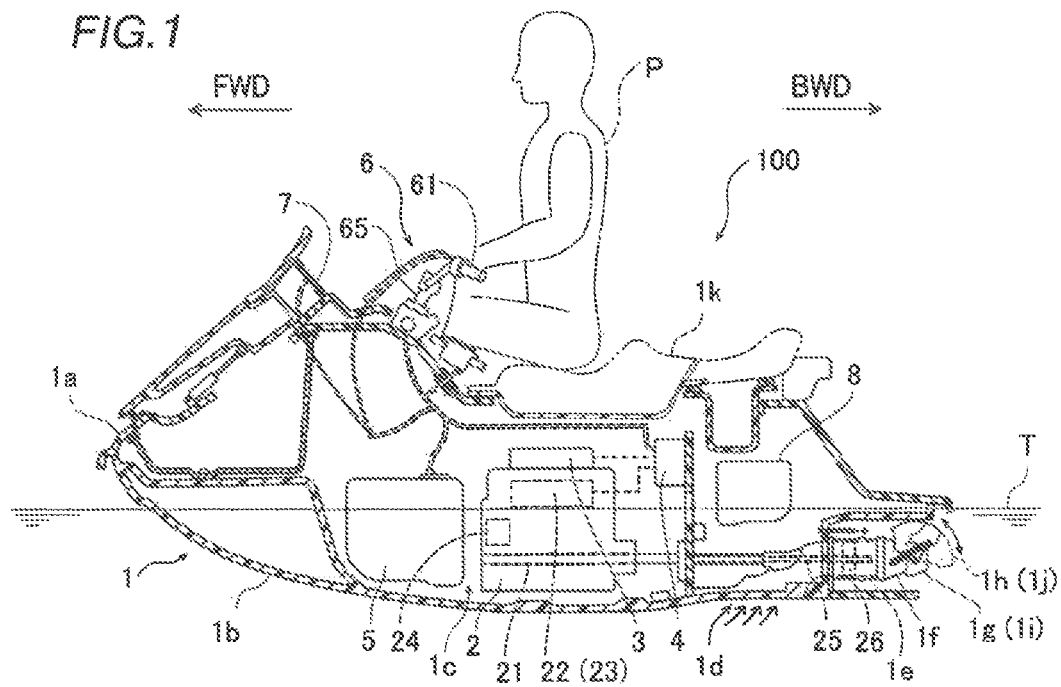
FIG. 1 is a side sectional view showing the overall structure of a small boat according to a first preferred embodiment of the present invention.

As shown in FIG. 1, the small boat 100 includes a boat body 1, an engine 2, a fuel injection system 3 (hereinafter referred to as an "FI system 3"), a controller 4, a fuel tank 5, a steering unit 6, a touch panel 7, and a battery 8. The touch panel 7 is an example of a "display" or an "operator". The controller 4 is an example of an "engine controller".

Figure 2:
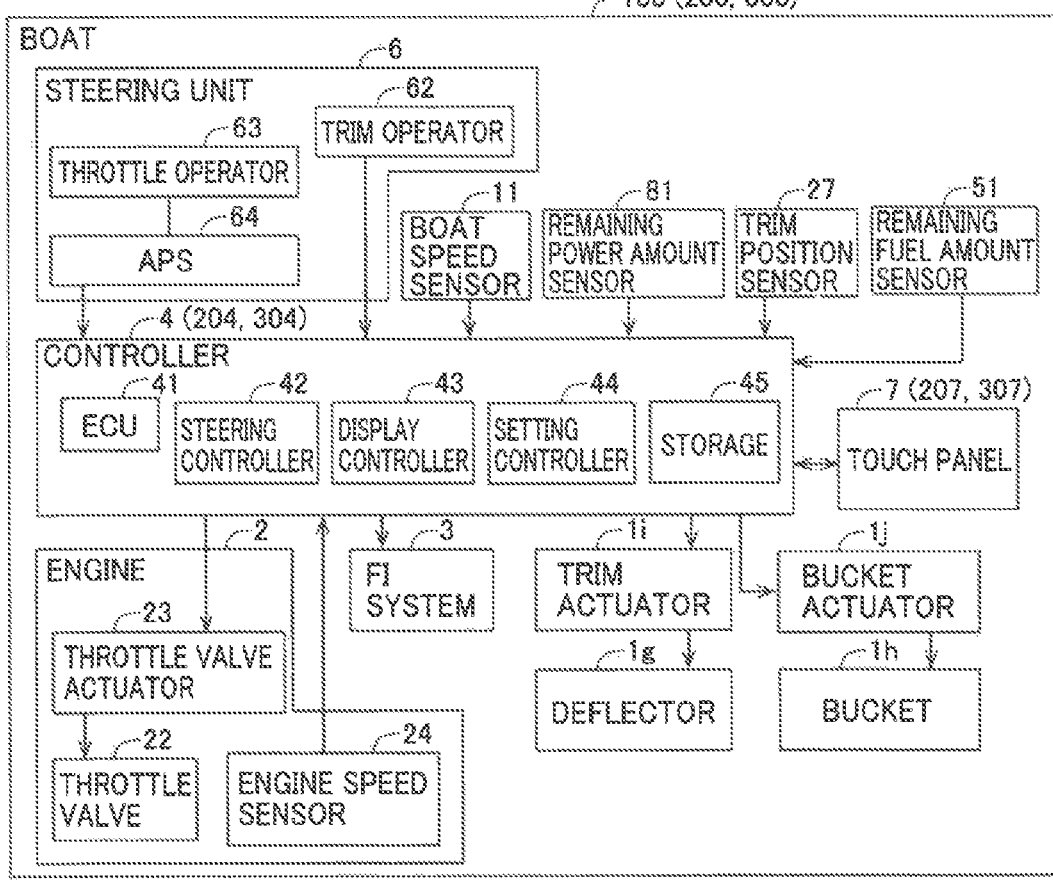
FIG. 2 is a block diagram showing the structure of a small boat according to each of first to third preferred embodiments of the present invention.

The boat body 1 includes a deck 1a and a hull 1b. The boat body 1 is immersed up to a predetermined height (a water surface T in FIG. 1) in a stationary state. An engine room 1c that houses the engine 2, the FI system 3, the controller 4, and the fuel tank 5 is provided in the boat body 1. As shown in FIG. 2, the boat body 1 includes a boat speed sensor 11 that detects the speed of the boat body 1. The boat speed sensor 11 is a GPS (global positioning system), for example. The boat speed sensor 11 transmits information (detection signal) about the boat speed V to the controller 4.

The engine 2 obtains a drive force to rotate a crankshaft 21 by burning an air-fuel mixture in a combustion chamber. According to the first preferred embodiment, the engine 2 preferably has a displacement of 1050 cc or more and less than 2100 cc (1800 cc or less, for example). Thus, the engine 2 is used as a single propulsion device.

As shown in FIG. 1, the engine 2 includes a throttle valve 22, a throttle valve actuator 23 (hereinafter referred to as an "actuator 23"), and an engine speed sensor 24. The opening degree of the throttle valve 22 is changed by the actuator 23 such that the amount of air supplied to the combustion chamber of the engine 2 is adjusted. As the opening degree of the throttle valve 22 increases, the rotational speed ω of the engine 2 increases. The engine speed sensor 24 detects the rotational speed ω of the engine 2 and transmits information (detection signal) about the rotational speed co of the engine 2 to the controller 4. The FI system 3 includes a fuel injection system that supplies fuel at the predetermined timing and an ignition system that ignites an air-fuel mixture at the predetermined timing. The actuator 23 and the FI system 3 are electrically connected to the controller 4, and are controlled based on commands from the controller 4.

The crankshaft 21 is connected to an impeller shaft 25. The impeller shaft 25 extends rearward from the engine room 1c. An impeller 26 is attached in the vicinity of a rear end of the impeller shaft 25. The impeller 26 is disposed inside an impeller housing 1e connected to a rear portion of a water intake 1d, suctions water below the water surface T from the water intake 1d, and jets the water rearward from a nozzle 1f provided behind the impeller housing 1e.

The boat body 1 includes a deflector 1g and a bucket 1h. The deflector 1g is located behind the nozzle 1f, and changes the direction of the water jetted rearward from the nozzle 1f to a right-left direction. The steering unit 6 is operated such that the orientation of the deflector 1g is changed via a steering cable (not shown). That is, when a pair of grips 61 of the steering unit 6 are operated by a rider P, the orientation of the deflector 1g is changed, and the small boat 100 is steered. When the trim position (angle relative to the nozzle 1f) of the deflector 1g is changed, the deflector 1g changes the direction of the water jetted rearward from the nozzle 1f to an upward-downward direction. A trim operator 62 of the steering unit 6 is operated such that the trim position of the deflector 1g is changed. For example, the small boat 100 includes a trim actuator 1i (see FIG. 2) connected to the deflector 1g and that changes the trim position of the deflector 1g according to a command from the controller 4 based on the operation of the trim operator 62. The boat body 1 includes a trim position sensor 27 that detects the trim position and transmits information about the trim position to the controller 4.

The bucket 1h is moved between the upper side and the rear side of the deflector 1g by a bucket actuator 1j. When the bucket 1h is moved to the rear side of the deflector 1g, the bucket 1h changes the direction of water jetted rearward from the nozzle 1f and the deflector 1g to a forward direction. The driving of the bucket actuator 1j is controlled by the controller 4, as shown in FIG. 2. As shown in FIG. 1, a seat 1k on which the rider P is seated and the steering unit 6 are provided on a portion of the deck 1a above the engine 2 in the boat body 1. The steering unit 6 is disposed in front of the seat 1k.

The fuel tank 5 contains the fuel to be supplied to the engine 2 via the fuel injection system of the FI system 3. In the fuel tank 5, a remaining fuel amount sensor 51 (see FIG. 2) that detects a remaining amount of fuel in the fuel tank 5 is disposed. The remaining fuel amount sensor 51 transmits a signal (information) about the detected remaining amount of fuel to the controller 4.

The steering unit 6 includes the trim operator 62, a throttle operator 63 (a lever, for example) that operates the opening degree of the throttle valve 22, an APS (accelerator position sensor) 64, the pair of grips 61, and a steering shaft 65 (see FIG. 1) rotated integrally with the pair of grips 61. The APS 64 detects the operation amount of the throttle operator 63 (the rotation angle of the lever, for example) and transmits a detection signal (information about the operation amount) to the controller 4. The trim operator 62 transmits operation information for raising the trim position to the controller 4 or transmits operation information for lowering the trim position to the controller 4 according to an operation by the rider P.

The battery 8 supplies electric power to each portion of the small boat 100. In addition, the small boat 100 includes a remaining power amount sensor 81 that detects a remaining power amount of the battery 8. The remaining power amount sensor 81 transmits information (detection signal) about the remaining power amount to the controller 4.

As shown in FIG. 2, the controller 4 includes an ECU (engine control unit) 41, a steering controller 42, a display controller 43, a setting controller 44, and a storage 45. In FIG. 2, the ECU 41, the display controller 43, the setting controller 44, and the storage 45 are illustrated as different functional blocks for the sake of description. However, the controller 4 may include a single control circuit (hardware), or may include a control circuit for each functional block. For example, the ECU of the controller 4 may include the functions of all the controllers.

Based on a detection signal from the APS 64, the ECU 41 controls the driving of the actuator 23 that adjusts the opening degree of the throttle valve 22 and controls the driving of the bucket actuator 1j that changes the position of the bucket 1h.

According to the first preferred embodiment, the ECU 41 controls the driving of the engine 2 based on a speed set value Vs and an acceleration set value As set by the setting controller 44. Specifically, the ECU 41 controls the rotational speed ω of the engine 2 based on the detection signal from the APS 64, the acceleration set value As (either "Normal" or "Slow"), and the information about the rotational speed ω of the engine 2.

For example, even when the magnitude of the detection signal from the APS 64 is the same when the acceleration set value As is set to "Slow" and "Normal", the ECU 41 performs control of making the increase rate of the rotational speed ω of the engine 2 smaller (accelerating the small boat 100 more slowly) when the acceleration set value As is set to "Slow" than when the acceleration set value As is set to "Normal".

The ECU 41 controls (feedback control, for example) the rotational speed ω of the engine 2 based on the boat speed V, the information about the rotational speed ω of the engine 2, and the speed set value Vs such that the boat speed V does not exceed the speed set value Vs (maximum speed set value). For example, the ECU 41 controls the driving of the actuator 23 such that the engine 2 is rotated at a rotational speed ω at which the small boat 100 is not accelerated when the boat speed V is the speed set value Vs.

The steering controller 42 switches between control of moving the small boat 100 forward and control of moving the small boat 100 rearward and performs control of changing the trim position. Specifically, the steering controller 42 acquires the operation information of the trim operator 62 and controls the driving of the trim actuator 1i based on the acquired operation information. In addition, the steering controller 42 controls the driving of the bucket actuator 1j based on the detection signal from the APS 64. For example, the steering controller 42 controls the driving of the bucket actuator 1j such that the bucket 1h is disposed behind the deflector 1g and the small boat 100 is moved rearward when the value of the detection signal indicating an operation of moving the small boat 100 rearward from the APS 64 exceeds the value of the detection signal indicating an operation of moving the small boat 100 forward from the APS 64.

The display controller 43 generates an image (video) displayed on the touch panel 7. The setting controller 44 acquires the operation information received by the touch panel 7 and performs setting process operations based on the acquired operation information. The storage 45 stores control programs for the controller 4 and stores information set by the setting controller 44.

As shown in FIG. 1, the touch panel 7 is disposed on the boat body 1. For example, the touch panel 7 is disposed in the vicinity of (in front of) the steering unit 6, and is placed at a position at which the rider P is able to perform a touch operation on the touch panel 7. Furthermore, the touch panel 7 is placed at a position at which the rider P is able to visually recognize the touch panel 7. According to the first preferred embodiment, the touch panel 7 preferably has a screen size of 4 inches or more and 12 inches or less. Furthermore, the touch panel 7 is a capacitive touch panel. That is, the touch panel 7 detects a coordinate position touched (contacted) by the finger of the rider P by detecting the electrostatic capacitance of each coordinate on the screen of the touch panel 7. That is, the touch panel 7 is a display that includes or defines and functions as an operator of the small boat 100.

Display control of the touch panel 7 is performed by the display controller 43. That is, in the following description, the expression "the touch panel 7 displays . . . " indicates that "the display controller 43 controls the touch panel 7 to display . . . ". Furthermore, the setting controller 44 performs control of receiving an operation through the touch panel 7 and setting the speed set value Vs and the acceleration set value As.

Figure 3:
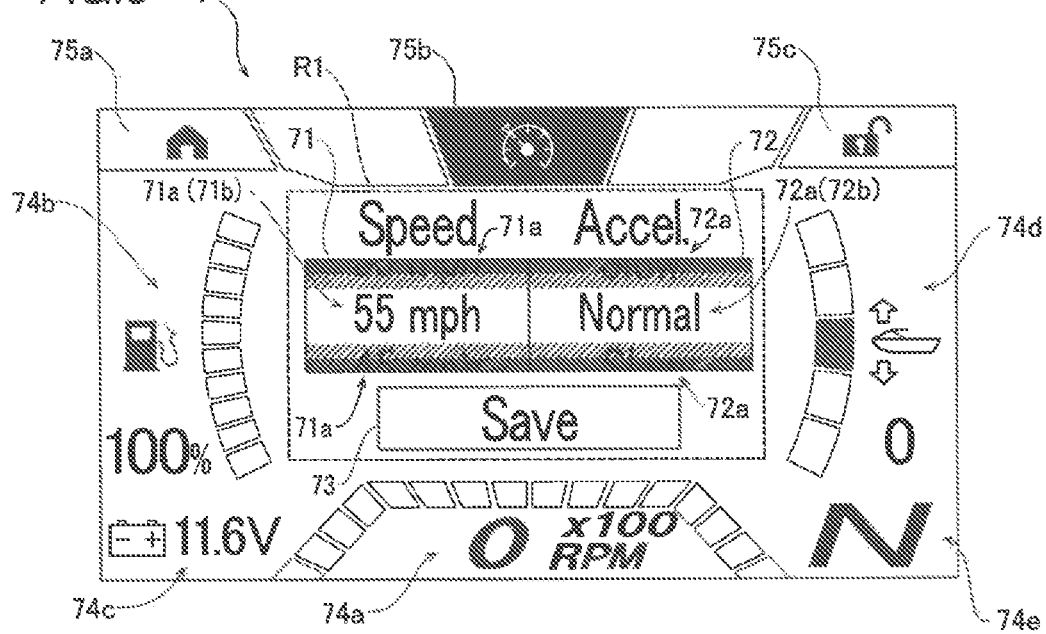
FIG. 3 is a diagram showing a speed/acceleration setting screen of a touch panel according to the first preferred embodiment of the present invention.

According to the first preferred embodiment, the touch panel 7 displays a speed setting image 71, which is an image through which the speed set value Vs is set, and an acceleration setting image 72, which is an image through which the acceleration set value As is set, side by side, as shown in FIG. 3. The touch panel 7 preferably displays the speed setting image 71 and the acceleration setting image 72 adjacent to each other in the right-left direction in a central region R1. The central region R1 is an example of an "image region".

According to the first preferred embodiment, the speed setting image 71 is a speed setting operator indication through which an operation of setting the speed set value Vs is received. The acceleration setting image 72 is operated independently of an operation of setting the speed set value Vs through the speed setting image 71, and is an acceleration setting operator indication through which an operation of setting the acceleration set value As is received. That is, according to the first preferred embodiment, the touch panel 7 is a single touch panel that displays the speed setting image 71 and the acceleration setting image 72 on the same screen.

Figure 4:
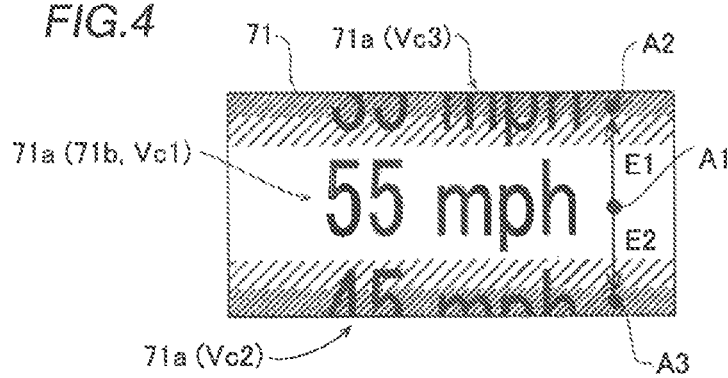
FIG. 4 is a diagram showing a speed setting image (a state before a touch operation) according to the first preferred embodiment of the present invention.
Figure 5:
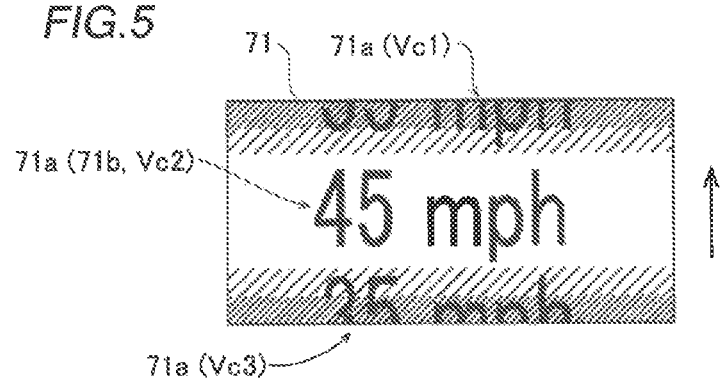
FIG. 5 is a diagram showing a speed setting image (a state after an upward touch operation) according to the first preferred embodiment of the present invention.
Figure 6:
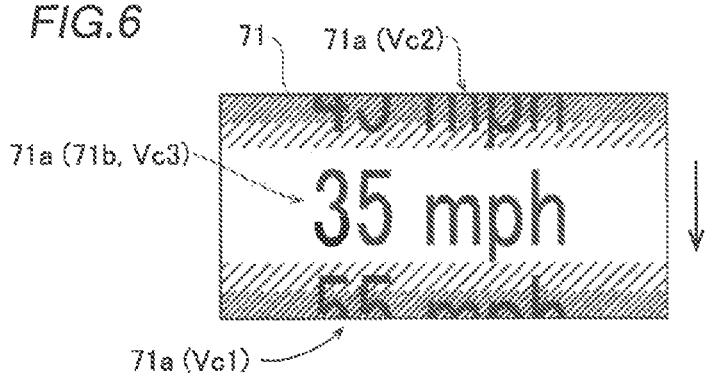
FIG. 6 is a diagram showing a speed setting image (a state after a downward touch operation) according to the first preferred embodiment of the present invention.

According to the first preferred embodiment, an operation of setting a currently selected option image 71b of one speed selected from among a plurality of option images 71a of a plurality of speed options Vc corresponding to a plurality of speeds as the speed set value Vs is received through the speed setting image 71, as shown in FIGS. 4 to 6. An operation of setting a currently selected option image 72b of one acceleration selected from among a plurality of option images 72a of a plurality of accelerations as the acceleration set value As is received through the acceleration setting image 72.

For example, according to the first preferred embodiment, the setting controller 44 sets a selected speed option Vc corresponding to the currently selected option image 71b as the speed set value Vs (maximum speed) when one speed option Vc is selected from among three speed options Vc (Vc1, Vc2, and Vc3) through the touch panel 7. For example, the speed option Vc1 is 55 [mph], the speed option Vc2 is 45 [mph], and the speed option Vc3 is 35 [mph]. That is, the speed option Vc is set as a discrete value.

According to the first preferred embodiment, the setting controller 44 sets a selected acceleration option Ac corresponding to the currently selected option image 72b as the acceleration set value As when one acceleration option Ac is selected from among two acceleration options Ac (Ac1 and Ac2) through the touch panel 7. For example, the acceleration option Ac1 is "Normal", and the acceleration option Ac2 is "Slow" in which the acceleration is smaller than that in "Normal".

Specifically, the touch panel 7 displays the speed setting image 71 as a switching image to set a speed showing a portion of a plurality of option images 71a. For example, in FIG. 3, the speed setting image 71 including the entire option image 71a corresponding to the speed option Vc1, a portion of the option image 71a corresponding to the speed option Vc2, and a portion of the option image 71a corresponding to the speed option Vc3 is displayed. The touch panel 7 displays the acceleration setting image 72 as a switching image to set an acceleration showing a portion of a plurality of option images 72a. For example, in FIG. 7, the acceleration setting image 72 including the entire option image 72a corresponding to the acceleration option Ac2 and a portion of the option image 72a corresponding to the acceleration option Ac1 is displayed.

According to the first preferred embodiment, the touch panel 7 switches the option image 71a displayed as a switching image when a touch operation is performed on the speed setting image 71, and switches the option image 72a displayed as a switching image when a touch operation is performed on the acceleration setting image 72. Specifically, the touch panel 7 switches the option image 71a of the speed setting image 71 or the option image 72a of the acceleration setting image 72, on which a touch operation has been performed, periodically and in stages in the upward-downward direction based on the touch operation on the speed setting image 71 or the acceleration setting image 72.

For example, as shown in FIG. 4, the speed setting image 71 is an image (hereinafter referred to as a "drum-shaped image") visually recognized as a drum-shaped (cylindrical, roll-shaped, reel-shaped) object that extends along the right-left direction. The option image 71a (speed option Vc1 "55 mph" in FIG. 4) is displayed on a central portion of the drum-shaped image in the upward-downward direction. For example, the option image 71a on the central portion is the currently selected option image 71b. According to the first preferred embodiment, on the drum-shaped image (switching image), the plurality of option images 71a (Vc1 to Vc3) are visibly aligned in the upward-downward direction. The shadow of the drum-shaped image becomes darker toward the upper end and the lower end in the vicinity of the upper end and the lower end of the image having a rectangular shape, for example, such that the drum-shaped image is visually recognized as an image showing a drum-shaped object.

When the touch panel 7 receives a touch operation on the speed setting image 71, the touch panel 7 switches the currently selected option image 71b from one option image 71a (a state in FIG. 4) to another option image 71a (a state in FIG. 5 or FIG. 6). For example, in the state shown in FIG. 4, the touch panel 7 moves the currently selected option image 71b ("55 mph") before the touch operation upward as shown in FIG. 5, moves the option image 71a ("45 mph")

displayed on a lower portion of the speed setting image 71 before the touch operation to the central portion, and displays the same as the currently selected option image 71b ("45 mph") when receiving the touch operation performed by moving the finger of the rider P at a position A1 on the currently selected option image 71b to an upper (arrow E1 direction) position A2. Another option image 71a ("35 mph") is displayed on the lower portion of the speed setting image 71.

In the state shown in FIG. 4, the touch panel 7 moves the currently selected option image 71b ("55 mph") before the touch operation downward as shown in FIG. 6, moves the option image 71a ("35 mph") displayed on an upper portion of the speed setting image 71 before the touch operation to the central portion, and displays the same as the currently selected option image 71b ("35 mph") when receiving the touch operation performed by moving the finger of the rider P at the position A1 on the currently selected option image 71b to a lower (arrow E2 direction) position A3. Another option image 71a ("45 mph") is displayed on the upper portion of the speed setting image 71.

The option images 71a excluding the currently selected option image 71b of the plurality of option images 71a included in the speed setting image 71 are only partially displayed. For example, only a lower portion of the option image 71a displayed on the upper portion of the speed setting image 71 is displayed, and an upper portion thereof is not displayed. Only an upper portion of the option image 71a displayed on the lower portion of the speed setting image 71 is displayed, and a lower portion thereof is not displayed.

When the touch operation described above is repeated on the speed setting image 71, the currently selected option image 71b is switched periodically and in stages in the upward-downward direction in the order of "35 mph", "45 mph", and "55 mph". That is, the speed setting image 71 (drum-shaped image) turns in the upward-downward direction.

According to the first preferred embodiment, as shown in FIG. 3, the touch panel 7 displays the acceleration setting image 72 as a switching image (drum-shaped image) adjacent to the speed setting image 71 in the right-left direction in the central region R1. For example, the acceleration setting image 72 has the same or substantially the same image size as the speed setting image 71. The acceleration setting image 72 is displayed on the right side with respect to the center of the touch panel 7 in the right-left direction, and the speed setting image 71 is displayed on the left side.

The touch panel 7 displays the acceleration setting image 72 in the same manner as the speed setting image 71, and switches the currently selected option image 72b based on a touch operation. Furthermore, the touch panel 7 does not switch display of the acceleration setting image 72 according to the touch operation on the speed setting image 71, and does not switch display of the speed setting image 71 according to the touch operation on the acceleration setting image 72. That is, the speed setting image 71 and the acceleration setting image 72 are operated independently of each other.

Figure 7:
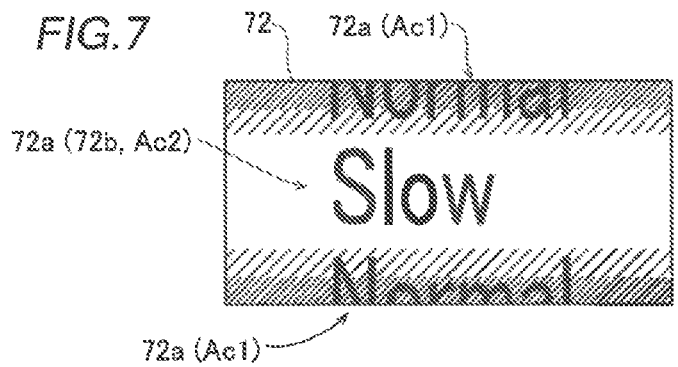
FIG. 7 is a diagram showing an acceleration setting image according to the first preferred embodiment of the present invention.

Specifically, in the state shown in FIG. 3, when receiving the touch operation on the currently selected option image 72b (acceleration option Ac1 "Normal") of the acceleration setting image 72, the touch panel 7 switches the currently selected option image 72b to another option image 72a (acceleration option Ac2 "Slow"), as shown in FIG. 7.

According to the first preferred embodiment, the touch panel 7 determines the option corresponding to the currently selected option image 71b as the speed set value Vs, and displays a determination operator image 73 through which an operation of determining the option corresponding to the currently selected option image 71b as the acceleration set value As is received, as shown in FIG. 3.

For example, the determination operator image 73 ("Save") is displayed below the speed setting image 71 and the acceleration setting image 72 in the central region R1. According to the first preferred embodiment, when a touch operation is performed on the determination operator image 73, the setting controller 44 determines (saves) the option ("55 mph", for example) corresponding to the currently selected option image 71b as the speed set value Vs, and determines (saves) the option corresponding to the currently selected option image 72b ("Normal", for example) as the acceleration set value As. The setting controller 44 stores the speed set value Vs and the acceleration set value As in the storage 45.

Figure 8:
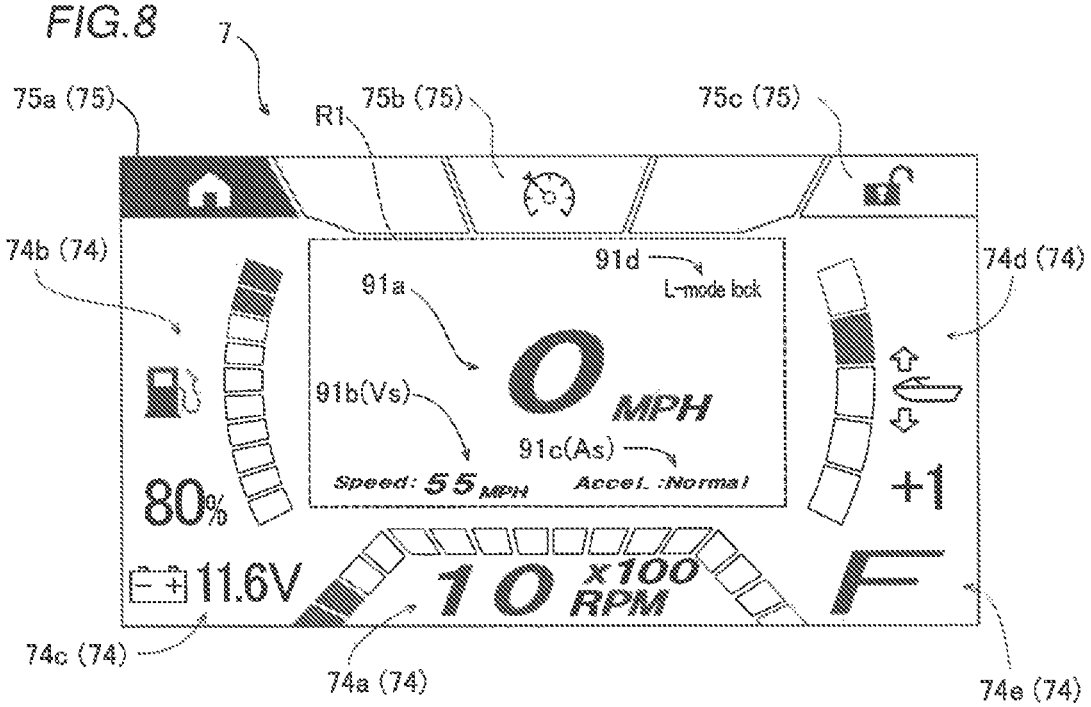
FIG. 8 is a diagram showing a home screen (during an operation stop) of the touch panel according to the first preferred embodiment of the present invention.

As shown in FIG. 8, after a touch operation is performed on the determination operator image 73 such that the speed set value Vs and the acceleration set value As are determined, the touch panel 7 stops displaying the speed setting image 71, the acceleration setting image 72, and the determination operator image 73 (returns to a home screen). For example, the touch panel 7 displays an image 91a (speedometer) indicating the boat speed V in the central region R1, an image 91b indicating the speed set value Vs, and an image 91c indicating the acceleration set value As on the home screen.

The touch panel 7 displays a boat information image 74 indicating information about the boat, the speed setting image 71, and the acceleration setting image 72 side by side. For example, the boat information image 74 includes an engine rotational speed image 74a indicating the rotational speed co of the engine 2 based on the engine speed sensor 24, a remaining fuel amount image 74b indicating the remaining amount of fuel in the fuel tank 5 based on the remaining fuel amount sensor 51, a remaining power amount image 74c indicating the remaining power amount of the battery 8 based on the remaining power amount sensor 81, a trim position display image 74d indicating the trim position, and a shift state display image 74e indicating the shift state.

For example, the engine rotational speed image 74a is displayed below the speed setting image 71, the acceleration setting image 72, and the determination operator image 73 on the touch panel 7. The remaining fuel amount image 74b is displayed on the left side of the speed setting image 71, the acceleration setting image 72, and the determination operator image 73 on the touch panel 7. The remaining power amount image 74c is displayed below the remaining fuel amount image 74b and on the left side of the engine rotational speed image 74a. The trim position display image 74d is displayed on the right side of the speed setting image 71, the acceleration setting image 72, and the determination operator image 73 on the touch panel 7. The shift state display image 74e ("F" indicates forward movement, for example) is displayed below the trim position display image 74d and on the right side of the engine rotational speed image 74a.

The touch panel 7 displays a screen switching image 75 through which an image displayed in the central region R1 is switched. The screen switching image 75 is displayed on an upper portion of the touch panel 7, for example. The screen switching image 75 includes a home switching image 75a through which an image in the central region R1 is switched to the home screen, a speed/acceleration setting screen switching image 75b through which an image in the central region R1 is switched to a screen (see FIG. 3) on which the speed set value Vs and the acceleration set value As are set, and a lock setting switching image 75c through which an image in the central region R1 is switched to a screen (see FIG. 9) through which a lock operation is received. For example, the home switching image 75a is displayed on a left portion, the speed/acceleration setting screen switching image 75b is displayed on a central portion in the right-left direction, and the lock setting switching image 75c is displayed on a right portion.

Figure 9:
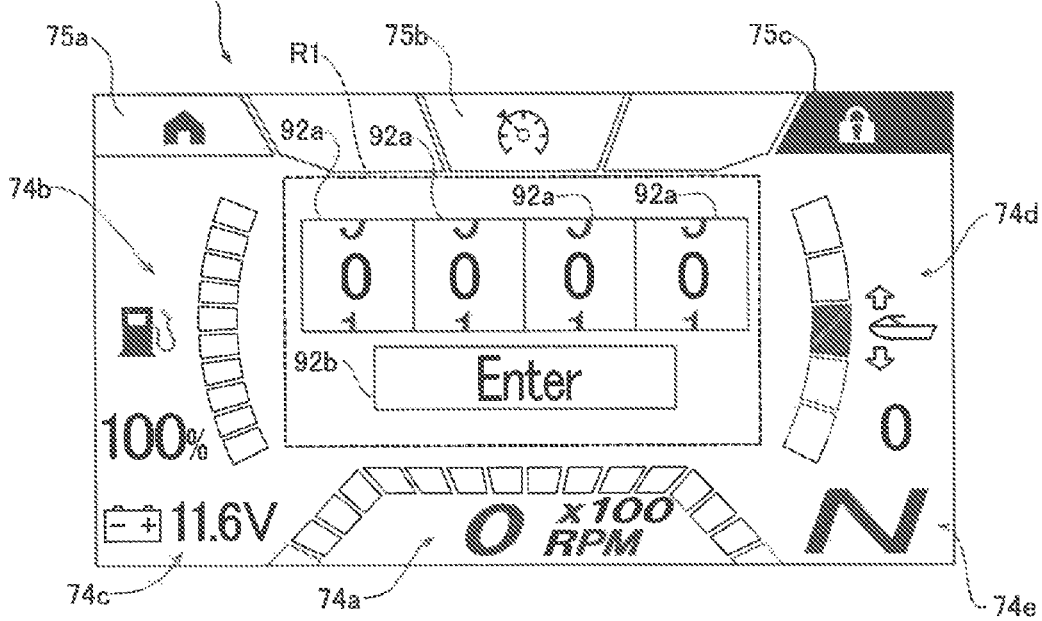
FIG. 9 is a diagram showing a screen through which a lock operation of the touch panel according to the first preferred embodiment of the present invention is received.
Figure 10:
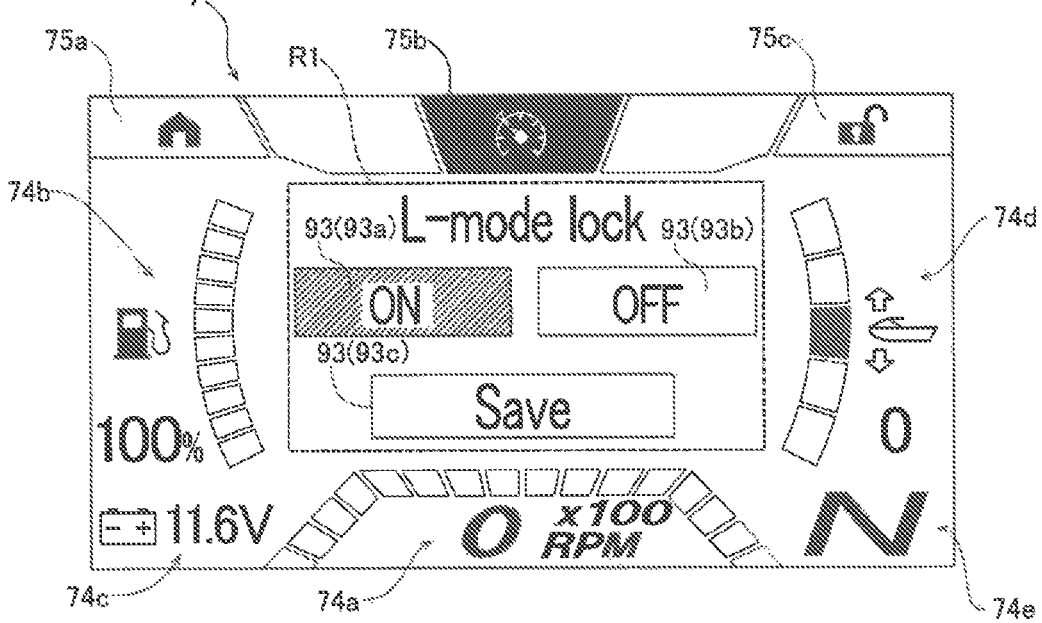
FIG. 10 is a diagram illustrating a lock determination image according to the first preferred embodiment of the present invention.

According to the first preferred embodiment, the touch panel 7 does not receive an operation of setting the speed set value Vs or an operation of setting the acceleration set value As upon receipt of a lock operation performed by inputting a plurality of identification characters, as shown in FIGS. 9 and 10.

Specifically, when receiving a touch operation on the lock setting switching image 75c, the touch panel 7 switches the speed setting image 71 and the acceleration setting image 72 to an identification character input image 92a and an input determination image 92b, which are images through which a lock operation is received, and displays the identification character input image 92a and the input determination image 92b in the central region R1, as shown in FIG. 9. The identification character input image 92a and the input determination image 92b are examples of a "locking image".

The lock operation preferably includes an operation of performing authentication using a PIN (personal identification number). For example, the identification character input image 92a includes a plurality of (four, for example) images (switching images, drum-shaped images) displayed in parallel to each other in the right-left direction and switched between numerical characters "0", "1", "2", "3", "4", "5", "6", "7", "8", and "9" as options in stages and periodically in the upward-downward direction. The touch panel 7 switches a numerical indication of each switching image (a currently selected numerical indication displayed on a central portion of the identification character input image 92a) based on a touch operation on the identification character input image 92a.

The touch panel 7 (setting controller 44) sets the currently selected numerical indication as an authentication number when a touch operation is performed on the input determination image 92b ("Enter"). Here, "0000" is set as an example of the authentication number. As shown in FIG. 10, the touch panel 7 switches the identification character input image 92a and the input determination image 92b to the lock determination image 93 in the central region R1. The lock determination image 93 is an example of a "locking image".

The lock determination image 93 is an operator indication through which whether or not authentication using a PIN is required (whether a lock operation is performed or an unlock operation is performed) is determined when the speed set value Vs and the acceleration set value As are set. Specifically, the lock determination image 93 includes a lock image 93a ("ON"), which is an image through which locking is selected, an unlock image 93b ("OFF"), which is an image through which unlocking operation is selected, and a determination image 93c ("Save") through which an operation corresponding to an image selected from the lock image 93a and the unlock image 93b is determined (stored).

When the lock image 93a is selected (displayed by hatching as shown in FIG. 10) and the determination image 93c is operated, for example, authentication using a PIN (see FIG. 9) is performed when a touch operation on the speed/acceleration setting screen switching image 75b is received next time. The touch panel 7 displays the speed setting image 71 and the acceleration setting image 72 (see FIG. 3) in the central region R1 when the identification characters input on the screen shown in FIG. 9 match the set authentication number "0000", and allows the rider P to set the speed set value Vs and the acceleration set value As. On the other hand, the touch panel 7 does not display the speed setting image 71 or the acceleration setting image 72 in the central region R1 when the identification characters input on the screen shown in FIG. 9 do not match the set authentication number "0000", and prohibits (restricts) the rider P from setting the speed set value Vs and the acceleration set value As (returns to the home screen, for example).

As shown in FIG. 8, the touch panel 7 displays an image 91d indicating that a lock operation has been performed (an image indicating that authentication using a PIN is required) in the central region R1 on the home screen in a state in which a lock operation (locking) is performed.

When the unlock image 93b is selected on the screen shown in FIG. 10 and the determination image 93c is operated, authentication using a PIN is not performed when a touch operation on the speed/acceleration setting screen switching image 75b is received next time. That is, the touch panel 7 displays the speed setting image 71 and the acceleration setting image 72 in response to receiving the touch operation on the speed/acceleration setting screen switching image 75b, and allows the rider P to set the speed set value Vs and the acceleration set value As.

Figure 11:
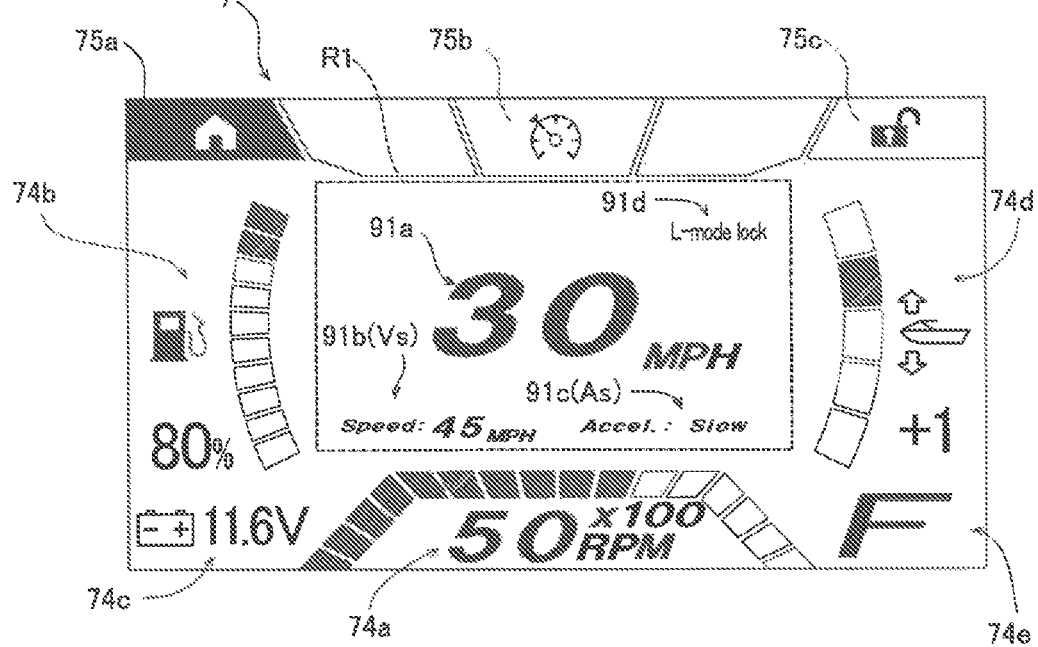
FIG. 11 is a diagram illustrating a home screen (during traveling) of the touch panel according to the first preferred embodiment of the present invention.

According to the first preferred embodiment, the touch panel 7 receives a touch operation on the speed setting image 71 and a touch operation on the acceleration setting image 72 when the rotational speed $\omega$ of the engine 2 is equal to or less than the upper limit $\omega$am of an idling rotational speed range $\omega$a, as shown in FIG. 8, and the touch panel 7 does not receive a touch operation on the speed setting image 71 or a touch operation on the acceleration setting image 72 when the rotational speed $\omega$ of the engine 2 exceeds the upper limit $\omega$am of the idling rotational speed range $\omega$a, as shown in FIG. 11.

Here, the upper limit $\omega$am varies depending on the type of small boat 100 (engine 2). For example, the touch panel 7 (or the controller 4) may not receive a touch operation on the speed setting image 71 or a touch operation on the acceleration setting image 72 when the rotational speed $\omega$ of the engine 2 exceeds the upper limit 200 RPM of the idling rotational speed range $\omega$a. Furthermore, for example, the touch panel 7 (or the controller 4) may not receive a touch operation on the speed setting image 71 or a touch operation on the acceleration setting image 72 when the rotational speed $\omega$ of the engine 2 exceeds the upper limit 300 RPM of the idling rotational speed range $\omega$a. In addition, for example, the touch panel 7 (or the controller 4) may not receive a touch operation on the speed setting image 71 or a touch operation on the acceleration setting image 72 when the rotational speed $\omega$ of the engine 2 exceeds the upper limit 1600 RPM of the idling rotational speed range $\omega$a.

In order to significantly reduce or prevent the operation of the touch panel due to water spray attached to the touch panel 7, the touch panel 7 may become operational (the controller 4 may receive a signal from the touch panel 7) after two seconds (after a lapse of a predetermined period of time) when the rotational speed $\omega$ of the engine 2 becomes equal to or less than the upper limit $\omega$am of the idling rotational speed range $\omega$a. However, the time until the touch panel 7 becomes operational is not necessarily two seconds after the rotational speed $\omega$ of the engine 2 becomes equal to or less than the upper limit $\omega$am of the idling rotational speed range ωa (the predetermined period of time is not necessarily two seconds). For example, the touch panel 7 may become operational after five seconds when the rotational speed ω of the engine 2 becomes equal to or less than the upper limit ωam of the idling rotational speed range ωa (the predetermined period of time is five seconds). In the touch panel 7 (or the controller 4), the predetermined period of time after the rotational speed ω becomes equal to or less than the upper limit ωam of the idling rotational speed range ωa may be set arbitrarily.

For example, when the rotational speed ω of the engine 2 exceeds the upper limit ωam, as shown in FIG. 11, the touch panel 7 does not display the speed setting image 71, the acceleration setting image 72, or the determination operator image 73. For example, when the rotational speed ω of the engine 2 exceeds the upper limit ωam (1500 RPM, for example), the touch panel 7 switches an image displayed in the central region R1 from the screen, through which the speed set value Vs and the acceleration set value As are set, shown in FIG. 3 to the home screen shown in FIG. 11. That is, on the home screen, the speed setting image 71, the acceleration setting image 72, and the determination operator image 73 are not displayed, and a touch operation on the speed setting image 71 or a touch operation on the acceleration setting image 72 is not received.

Figure 12:
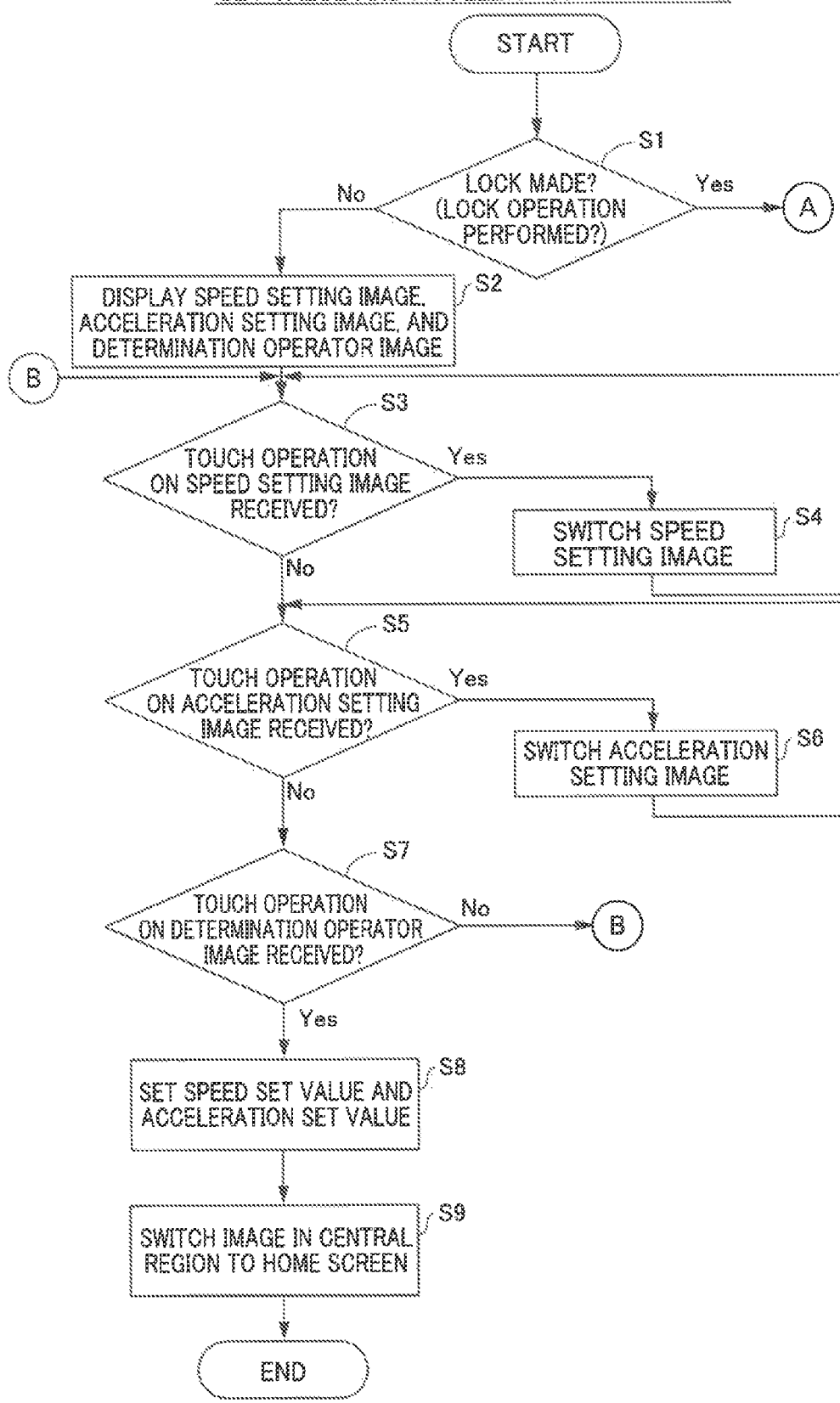
FIG. 12 is a flowchart showing control steps to set the speed set value and the acceleration set value of the small boat according to the first preferred embodiment of the present invention.

A method for controlling the small boat 100 according to the first preferred embodiment is now described with reference to FIGS. 3 to 8 and 12. FIG. 12 is a flowchart showing control steps to set the speed set value Vs and the acceleration set value As of the small boat 100. The control process operations of the small boat 100 are performed by the controller 4. The control process operations are started in response to a touch operation on the speed/acceleration setting screen switching image 75b of the touch panel 7.

In step S1, it is determined whether or not a lock (L-mode lock) has been made (whether or not a lock operation has been performed). When a lock has been made, the process advances to step S101 (see FIG. 13), and when a lock has not been made, the process advances to step S2.

In step S2, the touch panel 7 displays the speed setting image 71, the acceleration setting image 72, and the determination operator image 73, as shown in FIG. 3. Thereafter, the process advances to step S3.

In step S3, it is determined whether or not a touch operation on the speed setting image 71 has been received. When a touch operation on the speed setting image 71 has been received, the process advances to step S4, and when a touch operation on the speed setting image 71 has not been received, the process advances to step S5.

In step S4, the touch panel 7 switches the currently selected option image 71b of the speed setting image 71 to another option image 71a, as shown in FIGS. 4 to 6. Thereafter, the process returns to step S3.

In step S5, it is determined whether or not a touch operation on the acceleration setting image 72 has been received. When a touch operation on the acceleration setting image 72 has been received, the process advances to step S6, and when a touch operation on the acceleration setting image 72 has not been received, the process advances to step S7.

In step S6, the touch panel 7 switches the currently selected option image 72b of the acceleration setting image 72 to another option image 72a, as shown in FIG. 7. Thereafter, the process returns to step S5.

In step S7, it is determined whether or not a touch operation on the determination operator image 73 has been received. When a touch operation on the determination operator image 73 has been received, the process advances to step S8, and when a touch operation on the determination operator image 73 has not been received, the process returns to step S3.

In step S8, the speed option Vc corresponding to the currently selected option image 71b is determined (set) as the speed set value Vs, and the acceleration option Ac corresponding to the currently selected option image 72b is determined (set) as the acceleration set value As. At this time, the speed set value Vs and the acceleration set value As are stored in the storage 45.

In step S9, the touch panel 7 displays the home screen (see FIG. 8). Thereafter, the control process operations to set the speed set value Vs and the acceleration set value As in the small boat 100 are terminated.

Figure 13:
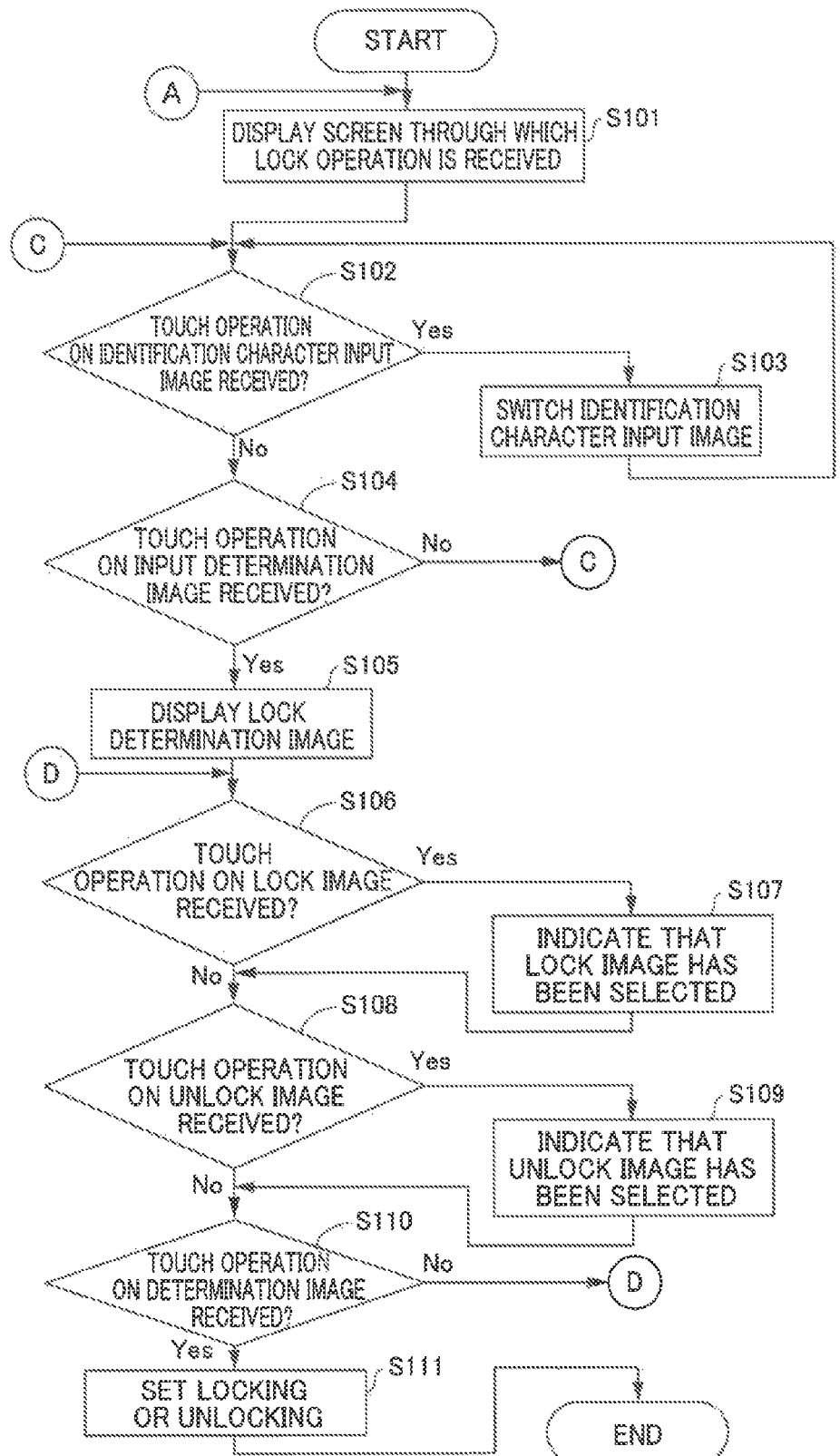
FIG. 13 is a flowchart showing control steps to lock and unlock the small boat according to the second preferred embodiment of the present invention.

Process operations to lock and unlock the small boat 100 according to the first preferred embodiment are now described with reference to FIGS. 9, 10, and 13. FIG. 13 is a flowchart showing control steps to perform locking and unlocking operations. The process operations are performed when a touch operation on the lock setting switching image 75c has been received or when it is determined that a lock has been made in step S1 (see FIG. 12).

In step S101, the identification character input image 92a and the input determination image 92b of the screen through which a lock operation is received are displayed in the central region R1 of the touch panel 7, as shown in FIG. 9. Thereafter, the process advances to step S102.

In step S102, it is determined whether or not a touch operation on the identification character input image 92a has been received. When a touch operation on the identification character input image 92a has been received, the process advances to step S103, and when a touch operation on the identification character input image 92a has not been received, the process advances to step S104.

In step S103, the image(s) of the identification character(s) (number(s)) selected on the identification character input image 92a is switched. Thereafter, the process advances to step S104.

In step S104, it is determined whether or not a touch operation on the input determination image 92b has been received. When a touch operation on the input determination image 92b has been received, the process advances to step S105, and when a touch operation on the input determination image 92b has not been received, the process returns to step S102.

In step S105, the lock determination image 93 is displayed in the central region R1, as shown in FIG. 10. Thereafter, the process advances to step S106.

In step S106, it is determined whether or not a touch operation on the lock image 93a has been received. When a touch operation on the lock image 93a has been received, the process advances to step S107, and when a touch operation on the lock image 93a has not been received, the process advances to step S108. In step S107, the lock image 93a is selected (indicated by hatching as shown in FIG. 10), and the process advances to step S108.

In step S108, it is determined whether or not a touch operation on the unlock image 93b has been received. When a touch operation on the unlock image 93b has been received, the process advances to step S109, and when a touch operation on the unlock image 93b has not been received, the process advances to step S110. In step S109, the unlock image 93b is selected, and the process advances to step S110.

In step S110, it is determined whether or not a touch operation on the determination image 93c has been received.

When a touch operation on the determination image 93c has been received, the process advances to step S111, and when a touch operation on the determination image 93c has not been received, the process returns to step S105.

In step S111, setting is performed such that authentication using a PIN is performed when a touch operation on the speed/acceleration setting screen switching image 75b is received next time, assuming that a lock operation has been received in a state in which the lock image 93a is selected, or setting is performed such that authentication using a PIN is not performed when a touch operation on the speed/acceleration setting screen switching image 75b is received next time, assuming that an unlock operation has been received in a state in which the unlock image 93b is selected. Thereafter, the control process operations to lock and unlock the small boat 100 are terminated.

According to the first preferred embodiment of the present invention, the following advantageous effects are achieved.

According to the first preferred embodiment of the present invention, the touch panel 7 displays the speed setting image 71 of the boat body and the acceleration setting image 72 of the boat body side by side. Furthermore, an operation of setting the speed set value of the boat body is received through the speed setting image 71, the acceleration setting image 72 is operated independently of the speed setting image 71, and an operation of setting the acceleration set value As of the boat body is received through the acceleration setting image 72. Accordingly, when the operations of setting the speed set value Vs and the acceleration set value As are performed, the operation of setting the speed set value Vs and the operation of setting the acceleration set value As are received individually while the rider P is able to visually recognize both the speed setting image 71 and the acceleration setting image 72. Consequently, the rider P sets the speed set value Vs and the acceleration set value As individually while visually recognizing the speed setting image 71 and the acceleration setting image 72 at the same time. Unlike the case in which only one of the speed setting image 71 and the acceleration setting image 72 is displayed on the touch panel 7, an operation of switching a state in which the speed setting image 71 is displayed on the touch panel 7 and a state in which the acceleration setting image 72 is displayed on the touch panel 7 is not required. Consequently, the operability and convenience at the time of setting are further improved while the operations of setting the speed set value Vs and the acceleration set value As individually are enabled.

According to the first preferred embodiment of the present invention, an operation of setting the option (speed option Vc) of one speed selected from among a plurality of options (speed options Vc) corresponding to the plurality of speeds as the speed set value Vs is received through the speed setting image 71. Furthermore, an operation of setting the option (acceleration option Ac) of one acceleration selected from among the plurality of options (acceleration options Ac) corresponding to the plurality of accelerations as the acceleration set value As is received through the acceleration setting image 72. Accordingly, one option is selected from among the plurality of options such that each of the speed set value Vs and the acceleration set value As is set, and thus the operation procedure is simplified as compared with the case in which it is necessary to specifically input the speed set value Vs and the acceleration set value As themselves. Thus, the operability and convenience at the time of setting are still further improved.

According to the first preferred embodiment of the present invention, an operation of setting the option (speed option Vc) of one speed selected from among the plurality of options (speed options Vc) corresponding to the three speeds as the speed set value Vs is received through the speed setting image 71. Furthermore, an operation of setting the option (acceleration option Ac) of one acceleration selected from the plurality of options (acceleration options Ac) corresponding to the two accelerations as the acceleration set value As is received through the acceleration setting image 72. Accordingly, a total of six combinations of the speed set value Vs and the acceleration set value As is able to be set, and thus the speed set value Vs and the acceleration set value As are more appropriately set according to the skill level of the rider P of the small boat 100 or to the sea conditions, for example, as compared with the case in which less than six combinations of the speed set value Vs and the acceleration set value As are able to be set. In addition, as compared with the case in which more than six combinations of the speed set value Vs and the acceleration set value As are able to be set, the number of options does not become too large, and thus the speed set value Vs and the acceleration set value As are appropriately set while a complicated operation of selecting one option from among a plurality of options is significantly reduced or prevented.

According to the first preferred embodiment of the present invention, the touch panel 7 includes or also defines and functions as the operator, and is a single touch panel that displays the speed setting image 71 and the acceleration setting image 72 on the same screen. Furthermore, the touch panel 7 receives a touch operation on the speed setting image 71 as an operation on the speed setting image 71, and receives a touch operation on the acceleration setting image 72 as an operation on the acceleration setting image 72. Accordingly, it is not necessary to provide a plurality of touch panels 7, and it is not necessary to provide an operator separately from the touch panel 7, and thus the number of components and the number of component types in the small boat 100 are reduced.

According to the first preferred embodiment of the present invention, the touch panel 7 displays at least one of the speed setting image 71 and the acceleration setting image 72 as the switching image showing a portion of the plurality of option images (71a or 72a), and switches the option image (71a or 72a) displayed as the switching image based on a touch operation on the switching image. Accordingly, it is not necessary to display all of the plurality of option images (71a or 72a) on the touch panel 7, and thus an increase in the size of the touch panel 7 is significantly reduced or prevented.

According to the first preferred embodiment of the present invention, the touch panel 7 displays the speed setting image 71 as the switching image to set a speed, and displays the acceleration setting image 72 as the switching image to set an acceleration. Accordingly, an increase in the size of the touch panel 7 is further significantly reduced or prevented as compared with the case in which the touch panel 7 displays only one of the speed setting image 71 and the acceleration setting image 72 as the switching image.

According to the first preferred embodiment of the present invention, the touch panel 7 displays the determination operator image 73 through which the displayed and currently selected option image 71b or 72b is determined as the speed set value Vs or the acceleration set value As, and receives a touch operation on the determination operator image 73. Furthermore, the controller 4 determines the displayed option image as the speed set value Vs or the acceleration set value As according to the touch operation on the determination operator image 73. Accordingly, the rider P determines whether to determine the option corresponding to the displayed option image as the speed set value Vs or the acceleration set value As (whether to perform a touch operation on the determination operator image 73) or to select another option (to select another option without performing a touch operation on the determination operator image 73) while visually recognizing the option image. Consequently, the convenience of an operation of determining one option from a plurality of options is improved.

According to the first preferred embodiment of the present invention, the touch panel 7 switches the option image 71a or 72a of the switching image periodically and in stages in the upward-downward direction based on a touch operation on the switching image (the speed setting image 71 or the acceleration setting image 72). Accordingly, the option image 71a or 72a is switched periodically such that even after all the option images 71a or 72a are sequentially displayed by switching the option image 71a or 72a of the switching image, the option image 71a or 72a is periodically and repetitively displayed. Furthermore, the option image 71a or 72a is switched in stages such that the rider P easily predicts the option image 71a or 72a to be displayed after switching as compared with the case in which the option image 71a or 72a is switched randomly instead of in stages.

According to the first preferred embodiment of the present invention, the touch panel 7 displays the switching image on which the plurality of option images 71a or 72a are visibly aligned in the upward-downward direction. Accordingly, unlike the case in which only one option image 71a or 72a is displayed on the switching image, the rider P visually recognizes one option image 71a or 72a and another option image 71a or 72a (an image showing an option at the next stage). Consequently, the rider P visually recognizes the option image 71a or 72a showing the option at the next stage so as to more easily predict the option image 71a or 72a to be displayed after switching.

According to the first preferred embodiment of the present invention, the touch panel 7 displays the speed setting image 71 as the switching image to set a speed, displays the acceleration setting image 72 as the switching image to set an acceleration adjacent to the speed setting image 71 in the right-left direction, and switches the option image 71a or 72a of the switching image on which a touch operation has been performed in the upward-downward direction based on the touch operation on the switching image to set a speed or the switching image to set an acceleration. Accordingly, as compared with the case in which the speed setting image 71 and the acceleration setting image 72 are disposed adjacent to each other in the upward-downward direction, one switching image of the speed setting image 71 and the acceleration setting image 72 is switched in the upward-downward direction such that the other switching image is easily operated without a touch operation on the other switching image.

According to the first preferred embodiment of the present invention, the touch panel 7 receives a touch operation on the speed setting image 71 and a touch operation on the acceleration setting image 72 when the rotational speed ω of the engine 2 is equal to or less than the upper limit ωam of the idling rotational speed range ωa, and does not receive a touch operation on the speed setting image 71 or a touch operation on the acceleration setting image 72 when the rotational speed ω of the engine 2 exceeds the upper limit ωam. Accordingly, a touch operation on the touch panel 7 by the rider P during traveling of the small boat 100 is significantly reduced or prevented.

According to the first preferred embodiment of the present invention, the touch panel 7 does not receive an operation of setting the speed set value Vs or an operation of setting the acceleration set value As when receiving a lock operation performed by inputting the plurality of identification characters. Accordingly, manipulations on the speed set value Vs and the acceleration set value As by a rider P other than the rider P that is permitted to change the setting are restricted. Furthermore, the operator including the speed setting image 71 and the acceleration setting image 72 receives a lock operation such that it is not necessary to provide an operator that receives a lock operation separately from the touch panel 7. Consequently, manipulations on the speed set value Vs and the acceleration set value As by a rider P other than the rider P that is permitted to change the setting are restricted while a complicated structure of the small boat 100 is significantly reduced or prevented. Thus, convenience of the rider P is improved.

According to the first preferred embodiment of the present invention, the touch panel 7 switches the speed setting image 71 and the acceleration setting image 72 to the identification character input image 92a, the input determination image 92b, and the lock determination image 93 through which a lock operation is received, and displays the identification character input image 92a, the input determination image 92b, and the lock determination image 93 in the central region R1 in which the speed setting image 71 and the acceleration setting image 72 are displayed. Accordingly, unlike the case in which the touch panel 7 further displays the identification character input image 92a, the input determination image 92b, and the lock determination image 93 while displaying the speed setting image 71 and the acceleration setting image 72, an increase in the size of the touch panel 7 is significantly reduced or prevented.

According to the first preferred embodiment of the present invention, the touch panel 7 switches the identification character input image 92a through which the plurality of identification characters are input to the lock determination image 93 in the central region R1. Accordingly, unlike the case in which the touch panel 7 further displays the identification character input image 92a while displaying the lock determination image 93, an increase in the size of the touch panel 7 is significantly reduced or prevented.

According to the first preferred embodiment of the present invention, the touch panel 7 has a screen size of 4 inches or more and 12 inches or less. Accordingly, the speed setting image 71 and the acceleration setting image 72 to be displayed on the touch panel 7 are relatively largely displayed as compared with the case in which the touch panel 7 has a screen size of less than 4 inches, and thus the visibility of the images is improved. Furthermore, the touch panel 7 has a screen size of 12 inches or less such that in the first preferred embodiment applied to a personal watercraft, which is relatively small among small boats 100, the touch panel 7 is easily placed on a personal watercraft.

According to the first preferred embodiment of the present invention, the engine 2 has a displacement of 1050 cc or more and less than 2100 cc. Accordingly, the operability and convenience at the time of setting are more effectively and further improved while the operations of setting the speed set value Vs and the acceleration set value As individually are enabled.

According to the first preferred embodiment of the present invention, the touch panel 7 displays the boat information image 74 indicating the information about the boat and the speed setting image 71 or the acceleration setting image 72 side by side. Accordingly, the rider P sets the speed set value Vs or the acceleration set value As while visually recognizing (referring to) the information about the boat. Consequently, when setting the speed set value Vs or the acceleration set value As according to the information about the boat, the rider P performs a setting operation without switching a screen showing the information about the boat to a screen on which the speed setting image 71 and the acceleration setting image 72 are displayed. Consequently, the operability and convenience are still further improved.

Second Preferred Embodiment

The structure of a small boat 200 according to a second preferred embodiment of the present invention is now described with reference to FIGS. 2 and 14 to 16. In the small boat 200 according to the second preferred embodiment, only a touch operation performed by moving the finger of a rider P from the lower side to the upper side is received unlike the small boat 100 according to the first preferred embodiment in which touch operations performed by moving the finger of the rider P in the upward direction and the downward direction are received. In the second preferred embodiment, the same structures as those of the first preferred embodiment are denoted by the same reference numerals, and description thereof is omitted.

Figure 14:
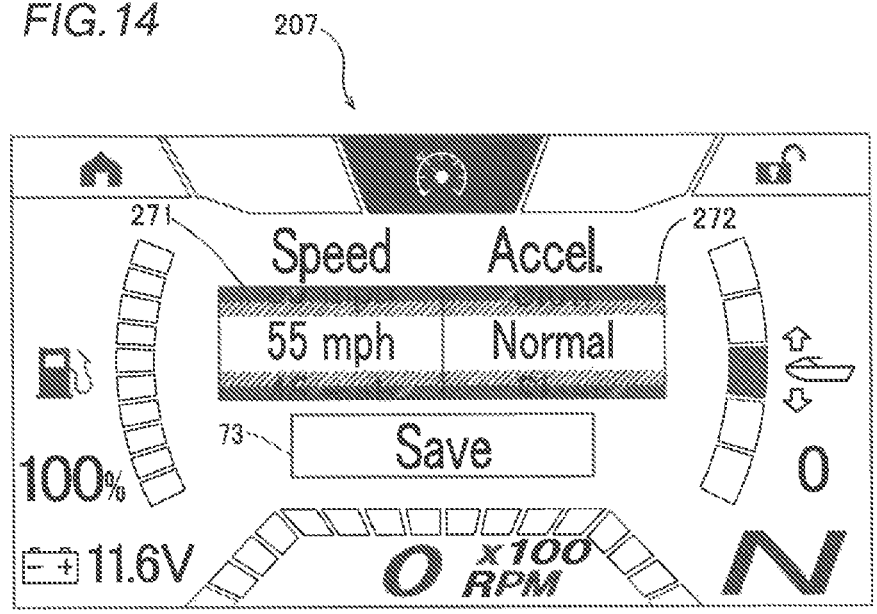
FIG. 14 is a diagram showing a speed/acceleration setting screen of a touch panel according to the second preferred embodiment of the present invention.

As shown in FIG. 2, the small boat 200 according to the second preferred embodiment includes a controller 204 and a touch panel 207. As shown in FIG. 14, the touch panel 207 displays a speed setting image 271 and an acceleration setting image 272 side by side similarly to the touch panel 7 according to the first preferred embodiment. Furthermore, the controller 204 controls the touch panel 207 to display images and receive operations.

Figure 15:
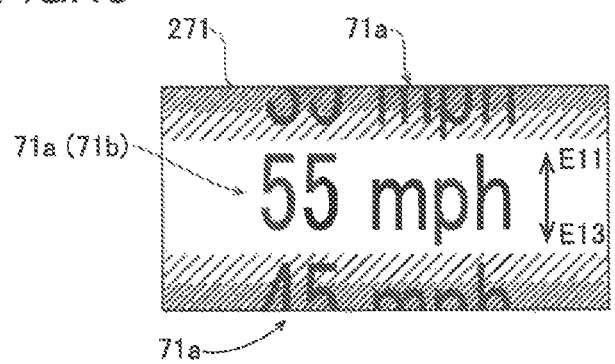
FIG. 15 is a diagram showing a speed setting image according to the second preferred embodiment of the present invention.
Figure 16:
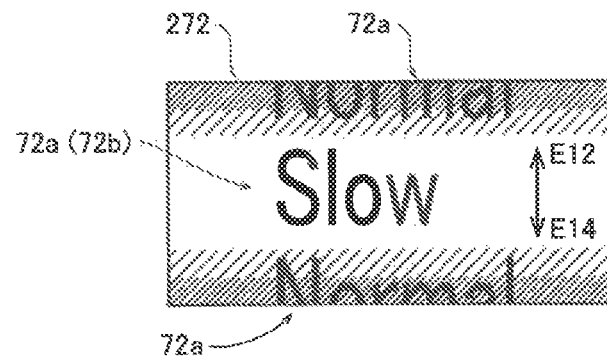
FIG. 16 is a diagram showing an acceleration setting image according to the second preferred embodiment of the present invention.

The touch panel 207 receives a touch operation performed by moving the finger of the rider P from the lower side to the upper side (along arrow E11) on the speed setting image 271, as shown in FIG. 15, receives a touch operation performed by moving the finger of the rider P from the lower side to the upper side (along arrow E12) on the acceleration setting image 272, as shown in FIG. 16, and does not receive a touch operation performed by moving the finger of the rider P from the upper side to the lower side (along arrow E13) on the speed setting image 271 or a touch operation performed by moving the finger of the rider P from the upper side to the lower side (along arrow E14) on the acceleration setting image 272. For example, when a position on the speed setting image 271 or the acceleration setting image 272 at which a touch operation is performed moves upward, the touch panel 207 turns the speed setting image 271 or the acceleration setting image 272 on which a touch operation has been performed to switch an option image 71a or 72a. Here, the expression "moving the finger of the rider P from the lower side to the upper side" indicates a broader concept including not only moving the finger of the rider P from the lower side to the upper side in a direction parallel to an upward-downward direction but also moving the finger of the rider P from the lower side to the upper side in a direction (oblique direction) inclined with respect to the upward-downward direction.

When a position on the speed setting image 271 or the acceleration setting image 272 at which a touch operation is performed moves downward, the touch panel 207 switches an image displayed in a center region R1 from a screen (see FIG. 14) through which a speed set value Vs and an acceleration set value As are set to a home screen (see FIG. 8). Thus, the speed setting image 271, the acceleration setting image 272, and a determination operator image 273 are not displayed on the home screen, and thus a touch operation on the speed setting image 271 and a touch operation on the acceleration setting image 272 are not received. The remaining structures of the second preferred embodiment are similar to those of the first preferred embodiment.

According to the second preferred embodiment of the present invention, the following advantageous effects are achieved.

According to the second preferred embodiment of the present invention, the touch panel 207 receives a touch operation performed by moving the finger of the rider P from the lower side to the upper side on the speed setting image 271 and a touch operation performed by moving the finger of the rider P from the lower side to the upper side on the acceleration setting image 272, and does not receive a touch operation performed by moving the finger of the rider P from the upper side to the lower side on the speed setting image 271 or a touch operation performed by moving the finger of the rider P from the upper side to the lower side on the acceleration setting image 272. Accordingly, even when water droplets move from the upper side to the lower side on the touch panel 207, the movement of the water droplets is prevented from being interpreted as a touch operation. The remaining advantageous effects of the second preferred embodiment are similar to those of the first preferred embodiment.

Third Preferred Embodiment

The structure of a small boat 300 according to a third preferred embodiment of the present invention is now described with reference to FIGS. 2 and 17 to 19. In the small boat 300 according to the third preferred embodiment, a skill level information setting image 390 is displayed on a touch panel 307. In the third preferred embodiment, the same structures as those of the first and second preferred embodiments are denoted by the same reference numerals, and description thereof is omitted.

Figure 17:
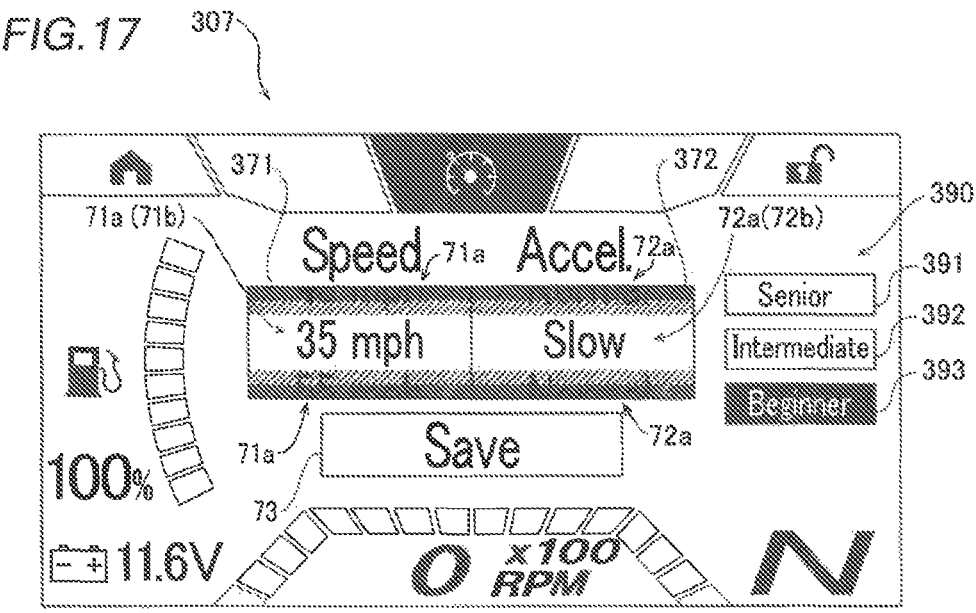
FIG. 17 is a diagram showing a speed/acceleration setting screen of a touch panel according to the third preferred embodiment of the present invention.
Figure 18:
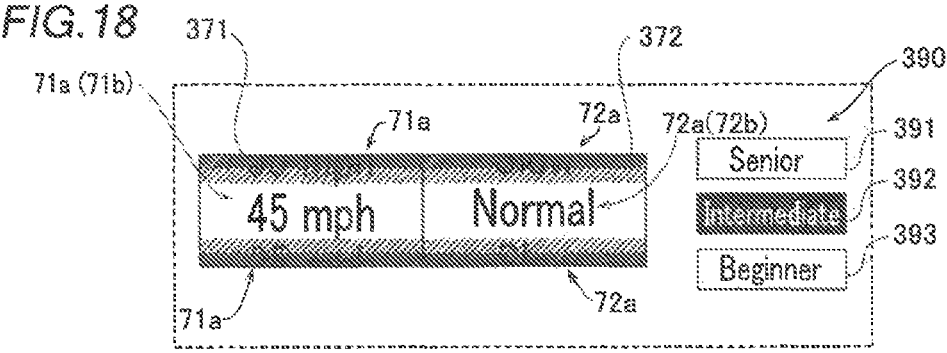
FIG. 18 is a diagram showing a speed setting image according to the third preferred embodiment of the present invention.
Figure 19:
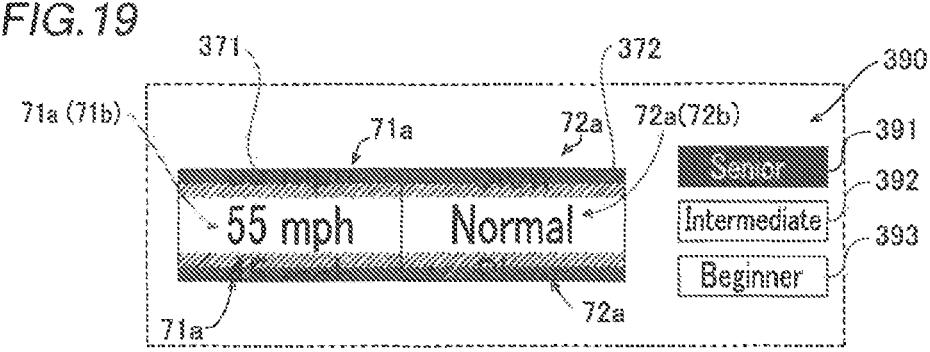
FIG. 19 is a diagram showing an acceleration setting image according to the third preferred embodiment of the present invention.

As shown in FIG. 2, the small boat 300 according to the third preferred embodiment includes a controller 304 and the touch panel 307. As shown in FIG. 17, the touch panel 307 displays the skill level information setting image 390 through which an operation of setting skill level information about a rider P is received, a speed setting image 371 through which an operation of setting a maximum speed set value (maximum speed) as a speed set value Vs is received, and an acceleration setting image 372 side by side. The skill level information setting image 390 is an example of a "skill level information setting operator". The speed setting image 371 is an example of a "maximum speed setting image".

The touch panel 307 switches the display contents of the speed setting image 371 and the display contents of the acceleration setting image 372 based on an operation on the skill information setting image 390.

Specifically, the skill level information setting image 390 includes an advanced operator image 391 ("Senior"), an intermediate operator image 392 ("Intermediate"), and a novice operator image 393 ("Beginner"). For example, when receiving a touch operation on the novice operator image 393, the touch panel 307 changes a currently selected option image 71b of the speed setting image 371 to a speed option Vc3 ("35 mph"), which is a relatively low speed set value Vs3, and changes a currently selected option image 72b of the acceleration setting image 372 to an acceleration option Ac2 ("Slow") corresponding to an acceleration set value As2.

When receiving a touch operation on the intermediate operator image 392, the touch panel 307 changes the currently selected option image 71b of the speed setting image 371 to a speed option Vc2 ("45 mph"), and changes the currently selected option image 72b of the acceleration setting image 372 to an acceleration option Ac1 ("Normal"), for example.

When receiving a touch operation on the advanced operator image 391, the touch panel 307 changes the currently selected option image 71b of the speed setting image 371 to a speed option Vc1 ("55 mph"), and changes the currently selected option image 72b of the acceleration setting image 372 to an acceleration option Ac1 ("Normal"), for example. The remaining structures of the third preferred embodiment are similar to those of the first preferred embodiment.

According to the third preferred embodiment of the present invention, the following advantageous effects are achieved.

According to the third preferred embodiment of the present invention, the touch panel 307 includes the skill level information setting image 390 through which an operation of setting the skill level information about the rider P is received and the speed setting image 371 through which an operation of setting the speed set value Vs (maximum speed set value) is received. Furthermore, the touch panel 307 switches the display contents of the speed setting image 371 (the maximum speed setting image through which the maximum speed set value is set) and the display contents of the acceleration setting image 372 based on an operation on the skill level information setting image 390. Accordingly, the optimum speed setting image 371 and acceleration setting image 372 are displayed according to the skill level of the rider P, and thus the convenience of setting the speed set value Vs and setting the acceleration set value As by the rider P is further improved. The remaining advantageous effects of the third preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

Figure 20:
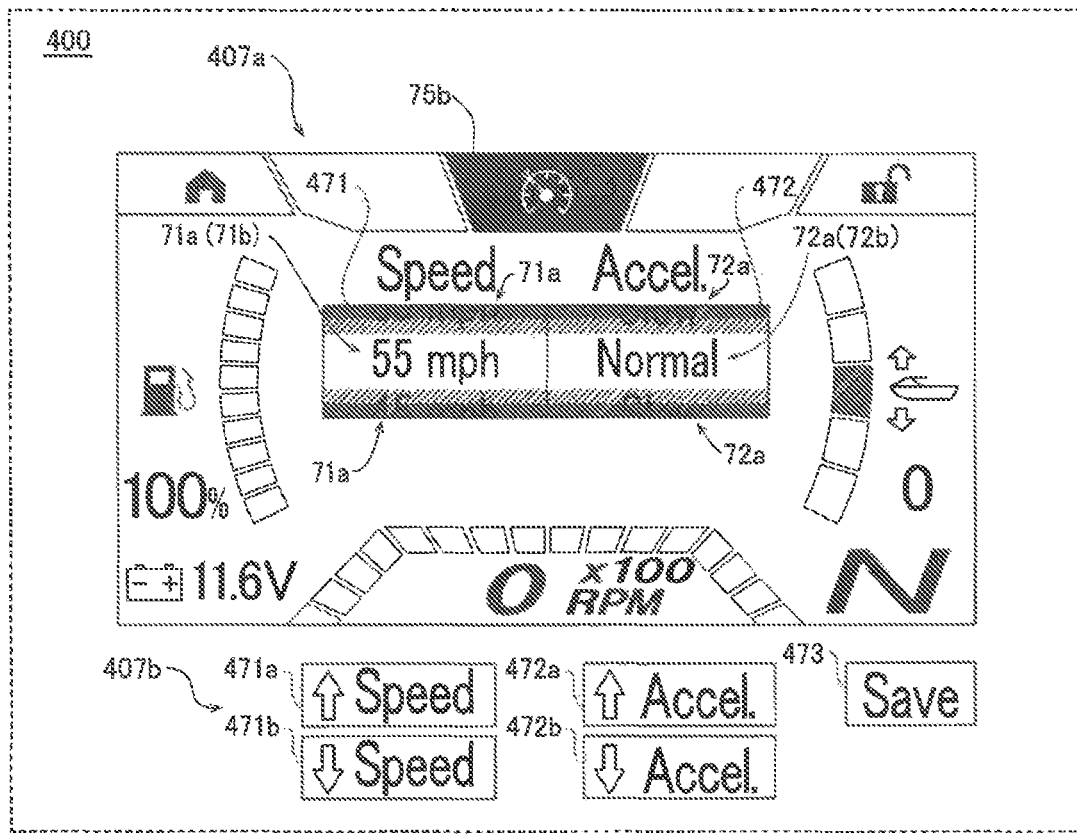
FIG. 20 is a diagram showing a speed/acceleration setting screen of a touch panel of a small boat according to a first modification of the first to third preferred embodiments of the present invention.

For example, while the small boat preferably includes the touch panel in each of the first to third preferred embodiments described above, the present invention is not restricted to this. For example, as in a small boat 400 according to a first modification shown in FIG. 20, a display 407a and a mechanical operator 407b may alternatively be provided. Specifically, the display 407a displays a speed setting image 471 and an acceleration setting image 472 as switching images. The operator 407b includes a first speed setting operator 471a, a second speed setting operator 471b, a first acceleration setting operator 472a, a second acceleration setting operator 472b, and a determination operator 473. On the display 407a, an option image 71a of the speed setting image 471 is switched due to an operation (pressing, for example) on the first speed setting operator 471a or the second speed setting operator 471b, and an option image 72a of the acceleration setting image 472 is switched due to an operation (pressing, for example) on the first acceleration setting operator 472a or the second acceleration setting operator 472b.

Figure 21:
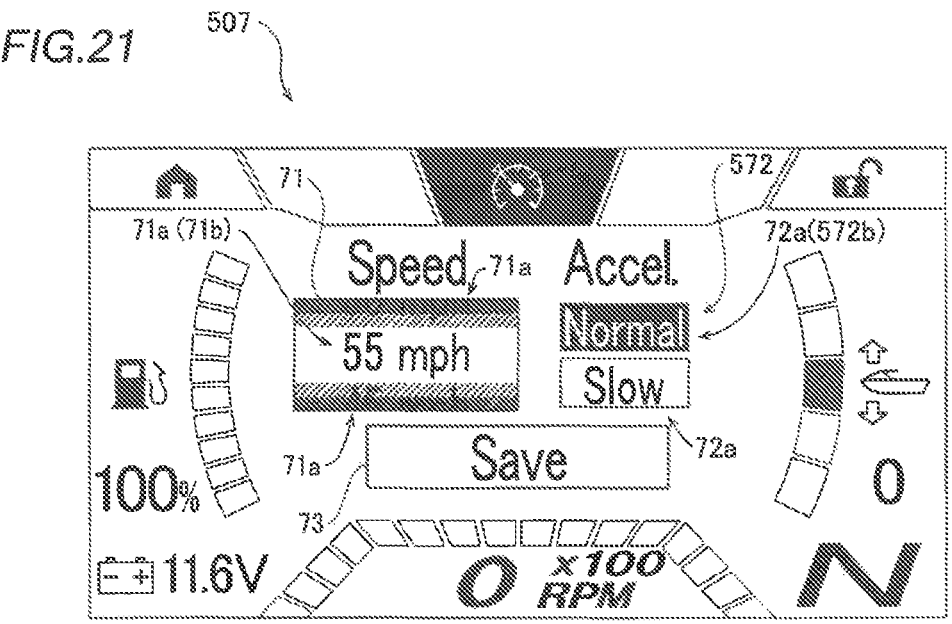
FIG. 21 is a diagram showing a speed/acceleration setting screen of a touch panel of a small boat according to a second modification of the first to third preferred embodiments of the present invention.

While both the speed setting image and the acceleration setting image are preferably switching images in each of the first to third preferred embodiments described above, the present invention is not restricted to this. For example, as in a touch panel 507 according to a second modification shown in FIG. 21, a speed setting image 71 may alternatively be a switching image whereas an acceleration setting image 572 may alternatively indicate all of option images 72a. For example, a currently selected option image 572b of the option images 72a is highlighted.

While the small boat is preferably a PWC in each of the first to third preferred embodiments described above, the present invention is not restricted to this. For example, the small boat may alternatively be a sports boat larger than a PWC.

While the speed set value is preferably set as a maximum speed (upper limit speed) in each of the first to third preferred embodiments described above, the present invention is not restricted to this. For example, the speed set value may alternatively be set as a target speed in an auto cruise control function.

While the speed options are preferably "55 mph", "45 mph", and "35 mph", and the acceleration options are preferably "Normal" and "Slow" in each of the first to third preferred embodiments described above, the present invention is not restricted to this. That is, the speed options and the acceleration options may alternatively be other than the above.

While the small boat preferably includes a single touch panel in each of the first to third preferred embodiments described above, the present invention is not restricted to this. For example, two touch panels may alternatively be disposed side by side, the speed setting image may alternatively be displayed on one of the two touch panels, and the acceleration setting image may alternatively be displayed on the other of the two touch panels.

While the switching images are preferably displayed as drum-shaped images in each of the first to third preferred embodiments described above, the present invention is not restricted to this. For example, the controller may alternatively control the touch panel to display the switching image such that the switching image does not move but one option image in the switching image switches to another option image.

While the touch panel preferably displays one determination operator image in each of the first to third preferred embodiments described above, the present invention is not restricted to this. For example, a speed setting determination operator image and an acceleration setting determination operator image may alternatively be provided separately.

While numbers are preferably used as examples of the identification characters in each of the first to third preferred embodiments described above, the present invention is not restricted to this. For example, language characters (alphabets, for example) may alternatively be used as the identification characters.

While display on the touch panel is preferably switched to the home screen when a touch operation from the upper side to the lower side is received in the second preferred embodiment described above, the present invention is not restricted to this. For example, the controller may alternatively control the touch panel not to switch the display on the touch panel to the home screen but to invalidate (not receive) a touch operation when a touch operation from the upper side to the lower side is received.

While the screen size of the touch panel is preferably 4 inches or more and 12 inches or less, and the displacement of the engine is preferably 1050 cc or more and less than 2100 cc in each of the first to third preferred embodiments described above, the present invention is not restricted to this. For example, when the small boat is a sports boat instead of a PWC, the screen size of the touch panel may alternatively be more than 12 inches, and the displacement of the engine may alternatively be 2100 cc or more.

While the boat speed is preferably detected by the boat speed sensor (GPS) in each of the first to third preferred embodiments described above, the present invention is not restricted to this. For example, the small boat may not include the boat speed sensor (GPS), and the controller may alternatively estimate the boat speed from the rotational speed of the engine.

While the touch panel preferably displays the characters "Speed" and the option image indicating the speed such as "55 mph" as an example of the speed setting image (speed setting operator), and displays the characters "Accel." and the option image indicating the acceleration such as "Normal" or "Slow" as an example of the acceleration setting image (acceleration setting operator), as shown in FIG. 3, for example, in each of the first to third preferred embodiments described above, the present invention is not restricted to this. That is, the speed setting image (speed setting operator) is not restricted to a direct indication of the speed such as "Speed" and "55 mph", but may be an indirect indication of the speed (such as a speed set value). For example, the controller may control the touch panel to selectively display the option image, which is not a direct indication, such as an image of fuel consumption, "Normal" or "Eco" in order to set the speed set value (maximum speed) based on the selected image. Furthermore, the acceleration setting image (acceleration setting operator) is not restricted to a direct indication of the acceleration such as "acceleration (Accel.)" and "Normal" or "Slow", but may be an indirect indication of the acceleration. For example, the controller may control the touch panel to selectively display the option image, which is not a direct indication of the acceleration, such as an image of fuel consumption, "Normal" or "Eco" in order to set the acceleration set value based on the selected image.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat comprising:
an engine disposed in a boat body;
a display that displays a speed setting image of the boat body and an acceleration setting image of the boat body side by side;
an operator including a speed setting operator through which an operation of setting a speed set value of the boat body is received and an acceleration setting operator operated independently of the speed setting operator and through which an operation of setting an acceleration set value of the boat body is received; and
an engine controller configured or programmed to control driving of the engine based on the operation of setting the speed set value and the operation of setting the acceleration set value received by the operator.

2. The boat according to claim 1, wherein
the speed setting operator receives an operation of setting an option of one speed selected from among a plurality of options corresponding to a plurality of speeds as the speed set value; and
the acceleration setting operator receives an operation of setting an option of one acceleration selected from among a plurality of options corresponding to a plurality of accelerations as the acceleration set value.

3. The boat according to claim 2, wherein
the speed setting operator receives an operation of setting an option of one speed selected from among three options corresponding to three speeds as the speed set value; and
the acceleration setting operator receives an operation of setting an option of one acceleration selected from two options corresponding to two accelerations as the acceleration set value.

4. The boat according to claim 1, wherein
the display includes the operator, and defines a touch panel that displays the speed setting image and the acceleration setting image on a same screen; and
the touch panel receives a touch operation on the speed setting image as the operation on the speed setting operator, and receives a touch operation on the acceleration setting image as the operation on the acceleration setting operator.

5. The boat according to claim 4, wherein the touch panel displays at least one of the speed setting image and the acceleration setting image as a switching image showing a portion of a plurality of option images, and switches an option image displayed as the switching image based on the touch operation on the switching image.

6. The boat according to claim 5, wherein the touch panel displays the speed setting image as the switching image to set a speed, and displays the acceleration setting image as the switching image to set an acceleration.

7. The boat according to claim 5, wherein
the touch panel displays a determination operator image through which the displayed option image is determined as the speed set value or the acceleration set value, and receives a touch operation on the determination operator image; and
the engine controller is configured or programmed to determine the displayed option image as the speed set value or the acceleration set value according to the touch operation on the determination operator image.

8. The boat according to claim 5, wherein the touch panel switches the option image of the switching image periodically and in stages in an upward-downward direction based on the touch operation on the switching image.

9. The boat according to claim 8, wherein the touch panel displays the switching image on which the plurality of option images are visibly aligned in the upward-downward direction.

10. The boat according to claim 8, wherein the touch panel displays the speed setting image as the switching image to set a speed, displays the acceleration setting image as the switching image to set an acceleration adjacent to the speed setting image in a right-left direction, and switches the option image of the switching image on which the touch operation has been performed in the upward-downward direction based on the touch operation on the switching image to set a speed or the switching image to set an acceleration.

11. The boat according to claim 4, wherein the touch panel receives the touch operation on the speed setting image and the touch operation on the acceleration setting image when a rotational speed of the engine is equal to or less than an upper limit of an idling rotational speed range, and does not receive the touch operation on the speed setting image or the touch operation on the acceleration setting image when the rotational speed of the engine exceeds the upper limit.

12. The boat according to claim 4, wherein the touch panel receives a touch operation performed by moving a finger of a boat operator from a lower side to an upper side on the speed setting image and a touch operation performed by moving the finger of the boat operator from the lower side to the upper side on the acceleration setting image, and does not receive a touch operation performed by moving the finger of the boat operator from the upper side to the lower side on the speed setting image or a touch operation performed by moving the finger of the boat operator from the upper side to the lower side on the acceleration setting image.

13. The boat according to claim 1, wherein the operator does not receive an operation of setting the speed set value or an operation of setting the acceleration set value upon receipt of a lock operation performed by inputting a plurality of identification characters.

14. The boat according to claim 13, wherein
the display includes the operator, and defines a touch panel that displays the speed setting image and the acceleration setting image on a same screen; and
the touch panel switches the speed setting image and the acceleration setting image to a locking image through which the lock operation is received, and displays the locking image in an image region in which the speed setting image and the acceleration setting image are displayed.

15. The boat according to claim 14, wherein the touch panel switches an identification character input image as the locking image through which the plurality of identification characters are input to a lock determination image as the locking image in the image region.

16. The boat according to claim 1, wherein the display has a screen size of 4 inches or more and 12 inches or less.

17. The boat according to claim 1, wherein the engine has a displacement of 1050 cc or more and less than 2100 cc.

18. The boat according to claim 1, wherein the display displays a boat information image indicating information about the boat and the speed setting image or the acceleration setting image side by side.

19. The boat according to claim 1, wherein
the operator includes a skill level information setting operator through which an operation of setting skill level information about a boat operator is received and the speed setting operator through which an operation of setting a maximum speed set value as the speed set value is received; and
the display switches display contents of a maximum speed setting image as the speed setting image through which the maximum speed set value is set, and switches display contents of the acceleration setting image based on an operation on the skill level information setting operator.

20. A personal watercraft comprising:
an engine disposed in a boat body;
a display that displays a speed setting image of the boat body and an acceleration setting image of the boat body side by side;
an operator including a speed setting operator through which an operation of setting a speed set value of the boat body is received and an acceleration setting operator operated independently of the speed setting operator and through which an operation of setting an acceleration set value of the boat body is received; and
an engine controller configured or programmed to control driving of the engine based on the operation of setting the speed set value and the operation of setting the acceleration set value received by the operator.

* * * * *